(12) United States Patent
Shimomura

(10) Patent No.: US 8,531,738 B2
(45) Date of Patent: Sep. 10, 2013

(54) OPTICAL SCANNING APPARATUS AND IMAGE FORMING APPARATUS USING THE SAME

(75) Inventor: Hidekazu Shimomura, Yokohama (JP)

(73) Assignee: Canon Kabushiki Kaisha (JP)

( * ) Notice: Subject to any disclaimer, the term of this patent is extended or adjusted under 35 U.S.C. 154(b) by 420 days.

(21) Appl. No.: 12/845,157

(22) Filed: Jul. 28, 2010

(65) Prior Publication Data

US 2011/0063691 A1 Mar. 17, 2011

(30) Foreign Application Priority Data

Sep. 14, 2009 (JP) .................................. 2009-211549

(51) Int. Cl.
*H04N 1/04* (2006.01)

(52) U.S. Cl.
USPC ............................ 358/474; 358/481; 358/483

(58) Field of Classification Search
USPC .......................................... 358/474, 481, 483
See application file for complete search history.

(56) References Cited

U.S. PATENT DOCUMENTS

| 7,391,542 B2 * | 6/2008 | Tanimura et al. ............. 358/481 |
| 7,414,761 B2 * | 8/2008 | Tochigi et al. ................. 358/483 |
| 2008/0151326 A1 * | 6/2008 | Shimomura .................. 358/474 |

FOREIGN PATENT DOCUMENTS

| JP | 10-048552 A | 2/1998 |
| JP | 2008-158415 A | 7/2008 |

* cited by examiner

*Primary Examiner* — Charlotte M Baker
*Assistant Examiner* — Rury Grisham
(74) *Attorney, Agent, or Firm* — Rossi, Kimms & McDowell LLP

(57) ABSTRACT

A light scanning apparatus comprises a light source unit, a deflection unit, an incident optical system, and an imaging optical system including a transmission type imaging optical element and a reflection optical element are provided. A light beam deflected for scanning by the deflection unit passes through the imaging optical element in order of a first and a second transmission surfaces, and then passes through the imaging optical element again a third and fourth transmission surfaces. The first and fourth transmission surfaces of the imaging optical element are different in shape from another in the sub-scanning direction. Respective components are set so that, in a sub-scanning section, the light beam deflected for scanning is turned back by the reflection optical element and refracted/diffracted at the first transmission surface in a direction in which a reflected light beam passes through the third transmission surface, and that predetermined Conditional Expression is satisfied.

10 Claims, 14 Drawing Sheets

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the same, and in particular, an image forming apparatus such as a laser beam printer (LBP), a digital copying machine, or a multifunction printer, which employs an electrophotography process.

2. Description of the Related Art

Up to now, an optical scanning apparatus is used for a laser beam printer (LBP), a digital copying machine, or a multifunction printer. In the optical scanning apparatus, a light beam optically modulated and emitted from a light source unit according to an image signal is periodically deflected by an optical deflector configured by, for example, a rotary polygon mirror. The deflected light beam is focused on a photosensitive recording medium (photosensitive drum) surface in the form of a spot by means of an imaging optical system having an fθ characteristic, and the surface is optically scanned to record an image.

Up to now, various optical scanning apparatus using a single imaging lens as the imaging optical system for the purpose of making the entire apparatus compact have been proposed (see Japanese Patent Application Laid-Open No. H10-48552). Further, up to now, various optical scanning apparatus have been proposed, in which a single imaging lens having a free curved surface and a single plane mirror are combined to an optical system provided between the optical deflector and the surface to be scanned, so as to turn back a light beam by the plane mirror, to thereby reduce a size of the entire apparatus (see Japanese Patent Application Laid-Open No. 2008-158415).

Japanese Patent Application Laid-Open No. H10-48552 provides an optical scanning apparatus in which, in order to image a light beam from a light source onto the surface to be scanned by the single imaging lens made of plastic, the imaging lens is formed into a suitable lens shape and suitably disposed, to thereby reduce a lens thickness to be suitable to be made of plastic.

In Japanese Patent Application Laid-Open No. 2008-158415, the imaging optical system includes the single imaging lens and the single plane mirror. A light beam passing through the imaging lens is turned back by the plane mirror and then passes through the imaging lens again in a direction reverse to an incident direction, to thereby enable an entire size of the optical scanning apparatus to be reduced. In the optical scanning apparatus disclosed in Japanese Patent Application Laid-Open No. 2008-158415, the plane mirror is tilted in a sub-scanning direction to separate between an incident light beam and an exit light beam or separate between the exit light beam and the optical deflector, on the surface of the imaging lens which is located on the optical deflector side.

In recent years, an optical scanning apparatus is sought after in which light beam separation in the sub-scanning direction is sufficiently ensured on the surface of the imaging lens and an apparatus height may be suppressed to a low level even in a case where the plane mirror is tilted in the sub-scanning direction and in a case where a light beam enters the optical deflector in an oblique direction.

SUMMARY OF THE INVENTION

It is an object of the present invention to provide an optical scanning apparatus in which light beam separation in a sub-scanning direction is sufficiently ensured on a surface of an imaging optical element and an apparatus height in the sub-scanning direction may be suppressed to a low level, and to provide an image forming apparatus using the optical scanning apparatus.

In order to achieve the above-mentioned object, an optical scanning apparatus according to one aspect of the present invention includes: a light source unit; a deflection unit including a deflection surface; an incident optical system for guiding a light beam emitted from the light source unit to the deflection unit; and an imaging optical system for imaging, on a surface to be scanned, light beam deflected for scanning on the deflection surface of the deflection unit, the imaging optical system including: a transmission type imaging optical element including a first transmission surface, a second transmission surface, a third transmission surface, and a fourth transmission surface; and a reflection optical element which includes a reflection surface and is provided on an optical path between the transmission type imaging optical element and the surface to be scanned, in which: the light beam deflected for scanning on the deflection surface of the deflection unit passes through the transmission type imaging optical element in order of the first transmission surface and the second transmission surface, and after being reflected on the reflection surface of the reflection optical element, passes through the transmission type imaging optical element again in order of the third transmission surface and the fourth transmission surface; in a sub-scanning section, the light beam entering the first transmission surface is bent at the first transmission surface in a direction in which the light beam reflected on the reflection surface of the reflection optical element passes through the third transmission surface; and the following condition is satisfied: $0.5° < \gamma - \gamma' < 10°$ where $\gamma(°)$ indicates an angle defined in the sub-scanning section, between a principal ray of the light beam entering a scanning center of the first transmission surface in a main scanning section and a normal to the first transmission surface at an intersection of the principal ray and the first transmission surface, and $\gamma'(°)$ indicates an angle defined in the sub-scanning section, between a principal ray of the light beam entering the scanning center of the first transmission surface in the main scanning section, which is bent at the first transmission surface and the normal to the first transmission surface at an intersection of the principal ray and the first transmission surface.

In the above-mentioned optical scanning apparatus, the following condition may be satisfied: $5° < \phi < 15°$ where $\phi(°)$ indicates an angle defined in the sub-scanning section, between the principal ray of the light beam which is deflected for scanning by the deflection unit and enters the scanning center of the first transmission surface in the main scanning section, and the principal ray of the light beam which is reflected on the reflection surface of the reflection optical element and exits from the fourth transmission surface.

Further, the light beam exiting from the incident optical system may obliquely enter the deflection surface of the deflection unit in the sub-scanning section.

Further, the light beam exiting from the incident optical system may have a light beam width in a main scanning direction which is wider than a width of the deflection surface of the deflection unit in the main scanning direction.

Further, the first transmission surface may be a sagittal line aspherical surface shape in which a surface in the sub-scanning section has an aspherical shape, and an aspherical amount of the sagittal line aspherical surface may reduce from an on-axis to an off-axis in a main scanning direction.

Alternatively, the first transmission surface may be a sagittal line tilt change surface in which a tilt angle in the sub-scanning section is changed based on a main scanning direction, and the tilt angle of the sagittal line tilt change surface in the sub-scanning section may increase from an on-axis to an off-axis in the main scanning direction.

Alternatively, the following condition may be satisfied: α<3° where α(°) indicates an absolute value of an angle defined in the sub-scanning section, between the deflection surface of the deflection unit and the reflection surface of the reflection optical element when the scanning center is scanned in a main scanning direction.

An image forming apparatus according to another aspect of the present invention includes: the optical scanning apparatus described above; a photosensitive member provided on the surface to be scanned; a developing device for developing, as a toner image, an electrostatic latent image formed on the photosensitive member by the light beam scanned by the optical scanning apparatus; a transferring device for transferring the developed toner image to a transfer material; and a fixing device for fixing the transferred toner image on the transfer material.

Alternatively, the image forming apparatus may include: the optical scanning apparatus described above; and a printer controller for converting code data to be input from an external device into an image signal and inputting the image signal to the optical scanning apparatus.

The present invention may provide the optical scanning apparatus in which light beam separation in the sub-scanning direction is sufficiently ensured on a surface of an imaging optical element and an apparatus height in the sub-scanning direction may be suppressed to a low level, and provide the image forming apparatus using the optical scanning apparatus.

Further features of the present invention will become apparent from the following description of exemplary embodiments with reference to the attached drawings.

DESCRIPTION OF THE EMBODIMENTS

Hereinafter, embodiments of the present invention are described with reference to the attached drawings.

(First Embodiment)

Figure 1:
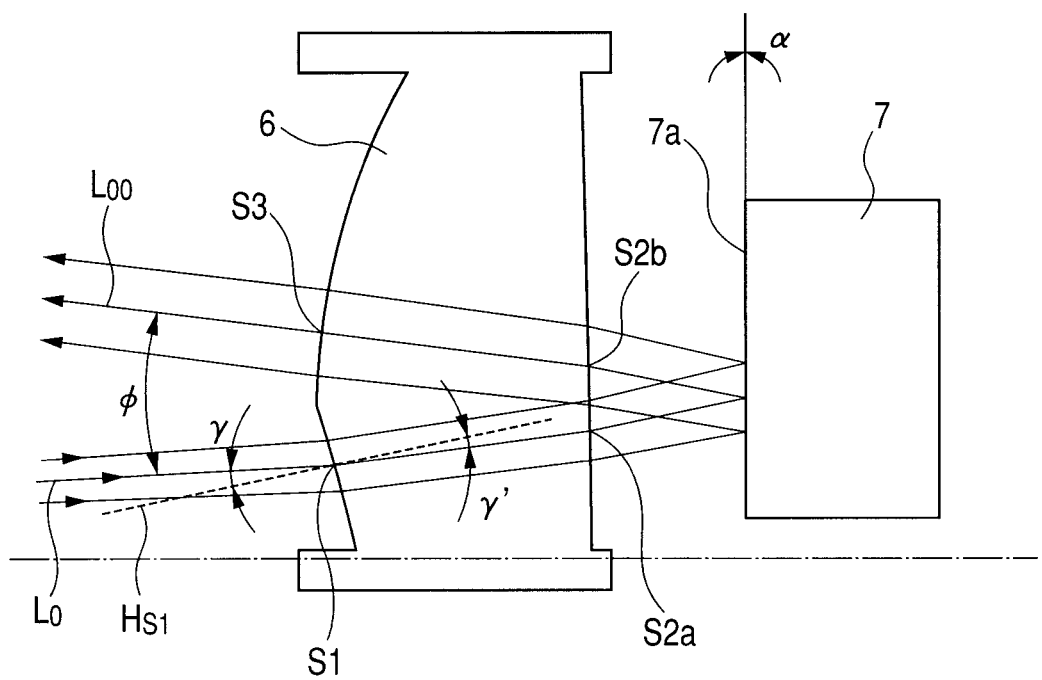
FIG. 1 is a sub-scanning cross sectional view illustrating an imaging optical system according to a first embodiment of the present invention.
Figure 2A:
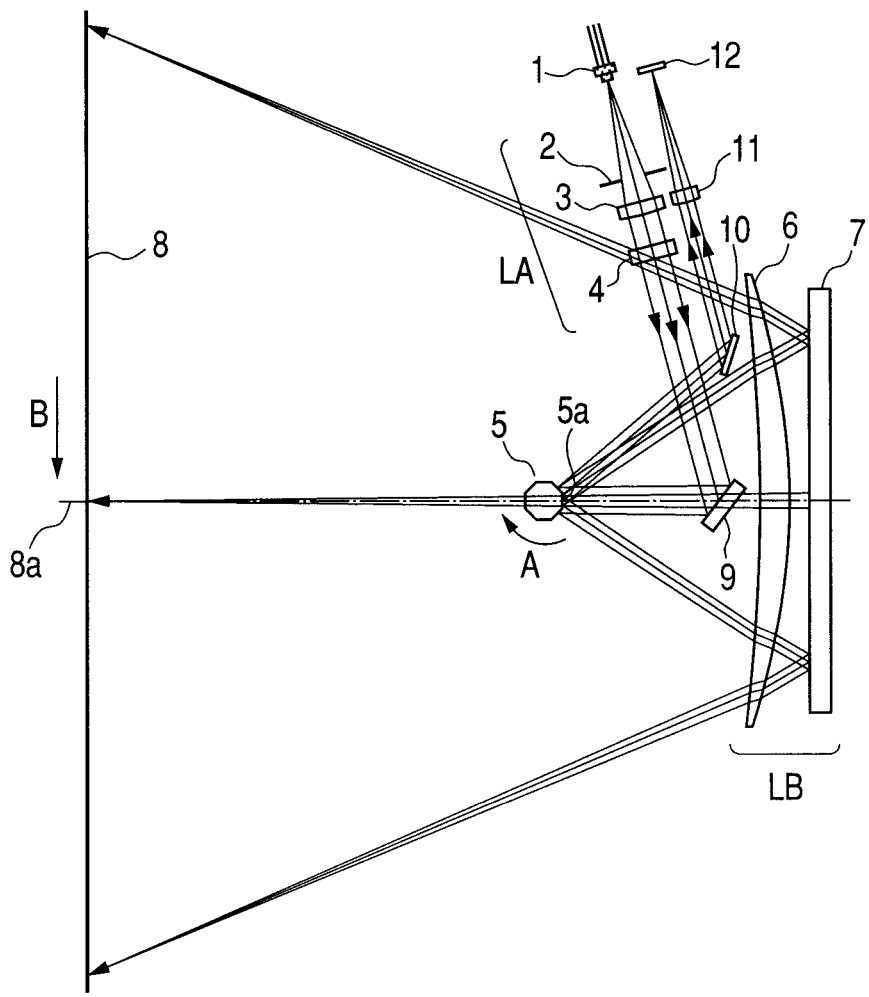
FIG. 2A is a main scanning cross sectional view illustrating an optical scanning apparatus according to the first embodiment of the present invention and FIG. 2B is a sub-scanning cross sectional view illustrating the optical scanning apparatus according to the first embodiment of the present invention.
Figure 2B:
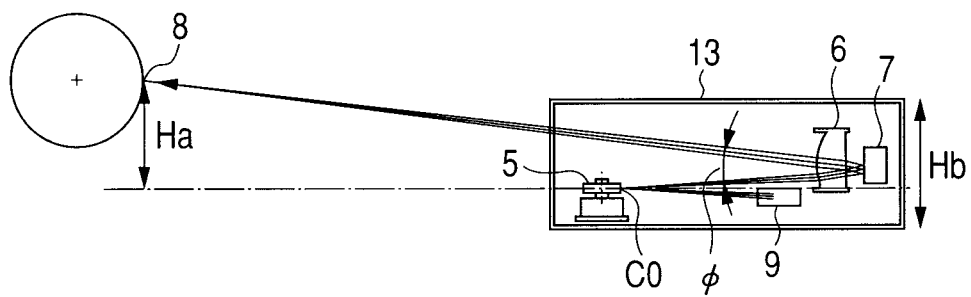

FIG. 1 is a cross sectional view illustrating a main portion of an imaging optical system in a sub-scanning direction (sub-scanning sectional view), the imaging optical system being used for an optical scanning apparatus according to a first embodiment of the present invention. FIG. 2A is a cross sectional view illustrating a main portion of the optical scanning apparatus according to the first embodiment of the present invention, in a main scanning direction (main scanning sectional view). FIG. 2B is a cross sectional view illustrating a main portion of the optical scanning apparatus according to the first embodiment of the present invention, in the sub-scanning direction (sub-scanning sectional view).

In the following description of this embodiment, an optical axis or on-axis of the imaging optical system is an axis in a direction perpendicular to a surface to be scanned at the center of the surface to be scanned. In other words, the optical axis or the on-axis is an axis which passes through a lens surface vertex of an imaging optical element and is perpendicular to the surface to be scanned. The sub-scanning direction (Z-direction) is a direction parallel to a rotation axis of the deflection unit. The main scanning section is a section of which the normal is the sub-scanning direction (direction parallel to rotation axis of deflection unit). The main scanning direction (Y-direction) is a direction in which the light beam deflected for scanning by the deflection unit is projected to the main scanning section. The sub scanning section is a section of which the normal is the main scanning direction.

In FIGS. 2A and 2B, a light source unit 1 includes, for example, a semiconductor laser device. An aperture stop 2 is provided for limiting a light beam passing therethrough to obtain a desired beam shape. A condensing lens (collimator lens) 3 is provided to convert a diverged light beam from the light source unit 1 into a weak converged light beam. The condensing lens 3 may convert an incident light beam not only into the converged light beam but also into a collimated light beam or a diverged light beam. A lens system (cylindrical lens) 4 has a specific power only in the sub-scanning section (sub-scanning direction) and forms an image of the light beam passing through the aperture stop 2 as a line image on a deflection surface (reflection surface) 5a of an optical deflector 5 described later in the sub-scanning section.

The condensing lens 3 and the cylindrical lens 4 may be integrally formed as a single optical element (anamorphic lens). The aperture stop 2, the condensing lens 3, and the cylindrical lens 4 each serve as an element of an incident optical system (condensing optical system) LA.

A plane mirror (turn back mirror) 9 is provided to make the entire optical scanning apparatus compact and deflect a light beam passing through the cylindrical lens 4 to the optical deflector 5. The optical deflector 5 serves as a deflection unit and includes a polygon mirror which is 9-mm in circumcircle diameter and has eight surfaces. The optical deflector 5 is rotated by a drive unit (not shown), for example, a motor at constant speed in a direction indicated by an arrow "A" of FIG. 2A.

In this embodiment, a so-called overfilled scanning optical system (OFS) is provided so that the light beam emitted from the light source unit 1 enters the deflection surface (reflection surface) 5a of the optical deflector 5 at a light beam width wider than a width of the deflection surface 5a through the incident optical system LA in the main scanning section. Therefore, the light beam is limited by the aperture stop 2 in the sub-scanning direction. The deflection surface 5a of the optical deflector 5 substantially serves as a member for limiting the light beam in the main scanning direction.

In the overfilled scanning optical system, the number of deflection surfaces may be increased without increasing the size of the optical deflector, and hence the overfilled scanning optical system is the technology effective in increasing the operating speed of the optical scanning apparatus. The number of deflection surfaces increases, but a deflectable angle (deflection angle) for each of the deflection surfaces reduces, and hence an optical path length between each deflection point and a surface to be scanned 8 generally lengthens. Therefore, in this embodiment, the light beam is turned back by a plane mirror 7 of an imaging optical system LB described later. Thus, even in the case of the overfilled scanning optical system, the optical scanning apparatus may be made compact.

The imaging optical system LB includes: at least one imaging lens (plastic lens) 6 serving as a transmission type imaging optical element having an fθ characteristic; and at least one mirror 7 serving as a reflection optical element located on an optical path between the imaging lens 6 and the surface to be scanned 8. The transmission type imaging optical element includes a refraction optical element or a diffraction optical element. In this embodiment, the transmission type imaging optical element is the refraction optical element.

FIG. 1 is an enlarged explanatory view partially illustrating the imaging lens 6 and the mirror 7 which are illustrated in FIG. 2A. The imaging lens 6 illustrated in FIG. 1 has a lens incidence surface (first transmission surface) S1 located on the optical deflector 5 (not shown in FIG. 1) side, a lens exit surface (second transmission surface) S2a located on the mirror 7 side, a lens reincidence surface (third transmission surface) S2b which a light beam turned back by the mirror 7 enters, and a lens re-exit surface (fourth transmission surface) S3 located on the optical deflector 5 (not shown in FIG. 1) side. Hereinafter, the lens incidence surface S1, the lens exit surface S2a, the lens reincidence surface S2b, and the lens re-exit surface S3 each are also simply referred to as "surface".

In this embodiment, the light beam deflected for scanning on the deflection surface 5a of the optical deflector 5 passes through the imaging lens 6 in order of the surface S1 and the surface S2a and is reflected on a reflection surface 7a of the mirror 7, and then passes through the imaging lens 6 again in order of the surface S2b and the surface S3. In this embodiment, the light beam is refracted at the four surfaces S1, S2a, S2b, and S3. In the sub-scanning section, the light beam passing through the surface S1, in particular, is refracted (diffracted in a case where imaging optical element is diffraction optical element) toward an optical path in which the light beam which is turned back by reflection on the mirror 7 passes through the surface S2b.

In this embodiment, the mirror 7 is the plane mirror having no power in the main scanning section and the sub-scanning section. The imaging optical system LB may include multiple transmission type imaging optical elements and multiple reflection type optical elements.

The imaging optical system LB forms, on the surface to be scanned (photosensitive drum surface) 8, a spot image of the light beam which is deflected for scanning by the optical deflector 5 and corresponds to image information, in the main scanning section (main scanning direction). The deflection surface 5a of the optical deflector 5 and the photosensitive drum surface 8 are made optically conjugate with each other in the sub-scanning section, to thereby perform surface tilt correction. In the case of the optical deflector having the multiple deflection surfaces, for example, in the case of the polygon mirror, a deflection surface tilt angle in the sub-scanning direction is changed for each of the deflection surfaces, and hence a surface tilt correction optical system is generally employed. The surface to be scanned 8 is the photosensitive drum surface and a scanning center 8a is the center of the surface to be scanned 8 in the main scanning direction.

A turn back mirror (BD mirror) 10 for synchronization detection is provided to reflect, to a synchronization detecting element 12 (described later) side, a synchronization detection light beam (BD light beam) for adjusting a timing of a scan start position on the photosensitive drum surface 8. A synchronization detecting lens (BD lens) 11 for synchronization detection is used to image (focus) the BD light beam on a surface of a slit (not shown) provided close to the synchronization detecting element 12. The synchronization detecting element 12 is an optical sensor (BD sensor). In this embodiment, the optical sensor 12 is provided to adjust the timing of the scan start position for image recording on the photosensitive drum surface 8, based on a synchronization signal (BD signal) obtained by detecting an output signal from the BD sensor 12. A case 13 is provided. The BD mirror 10, the BD lens 11, and the BD sensor 12 each serve as an element of a synchronization position detection unit (BD optical system).

In this embodiment, the diverged light beam which is optically modulated based on the image information and emitted from the semiconductor laser 1 is formed into a predetermined sectional shape with a predetermined light beam width by the aperture stop 2, and then converted into the weak converged light beam by the collimator lens 3. After that, the light beam passes through the cylindrical lens 4 and the turn back mirror 9, and enters (frontally enters) the deflection surface 5a at the middle or substantially middle of the deflection angle of the optical deflector 5 in the main scanning section. In the sub-scanning section, the light beam enters (obliquely enters) the deflection surface 5a at a predetermined angle relative to the sub-scanning direction (3° relative to normal to deflection surface 5a).

In the overfilled scanning optical system, the light beam is eclipsed by the deflection surface, and hence a diameter of a spot image formed on the surface to be scanned is changed depending on an image height. In the overfilled scanning optical system, in order to minimize the eclipse of the light beam which is caused by the deflection surface, the light beam normally enters the deflection surface from the optical axis direction of the imaging optical system in the main scanning section. Therefore, in order that the incident light beam entering the deflection surface and the light beam deflected by the deflection surface be spatially separated from each other, it is necessary to cause the light beam to obliquely enter the deflection surface in the sub-scanning section.

The light beam which is reflected on and deflected by the deflection surface 5a of the optical deflector 5 passes through the imaging lens 6, is reflected on the plane mirror 7, and passes through the imaging lens 6 again in a direction reverse to the incident direction. Then, an image of the light beam passing through the imaging lens 6 is formed into a spot shape on the photosensitive drum surface 8. The optical deflector 5 is rotated in the direction indicated by the arrow "A" to optically scan the photosensitive drum surface 8 in a direction indicated by an arrow "B" (main scanning direction) at constant speed. Therefore, image recording is performed on the photosensitive drum surface 8 corresponding to a recording medium.

In this embodiment, a part of the scanning light beam which is deflected for scanning by the optical deflector 5 is turned back in the light source unit 1 direction by the plane mirror (turn back mirror) 10 and thus enters the synchronization detecting element 12 through the synchronization detecting lens 11. Therefore, in this embodiment, a synchronization detection signal is generated for each scanning to control a write timing for aligning an image write position.

In this embodiment, as described above, the light beam deflected by the deflection surface 5a of the optical deflector 5 passes through the imaging lens 6 one time, is turned back by the plane mirror 7, and passes through the imaging lens 6 again in the direction reverse to the incident direction. Such a structure is employed to make the entire apparatus compact. Next, lens surface shapes and an optical configuration in this embodiment are shown in Table 1.

TABLE 1

| Design Data | | |
|---|---|---|
| Used wavelength | λ(nm) | 790 |
| Lens refractive index | n | 1.52781 |
| Main scanning laser incident angle (degrees) | | 0 |
| Sub-scanning laser incident angle (degrees) | | 3 |
| Maximum light beam exit angle (degrees) | | ±33.423 |
| Polygon rotation center coordinates (mm) | Y-direction | 0.000 |
| | X-direction | −4.157 |
| The number of Polygon surfaces | | 8 |
| Polygon circumcircle diameter (mm) | | φ9 |
| Mirror tilt angle (degrees) | α | 0 |

TABLE 1-continued

| Design Data | | |
|---|---|---|
| Effective scanning width | W | 210 |
| fθ coefficient | κ(rad/mm) | 180 |

| Lens Configuration | | | |
|---|---|---|---|
| | X-direction | Y-direction | Z-direction |
| Lens incidence surface S1 | 45.000 | 0.000 | 2.358 |
| Lens exit surface S2a | 51.500 | 0.000 | 0.000 |
| Mirror surface 7 | 55.500 | 0.000 | 0.000 |
| Lens reincidence surface S2b | 51.500 | 0.000 | 0.000 |
| Lens re-exit surface S3 | 44.300 | 0.000 | 5.700 |
| Surface to be scanned 8 | −108.174 | 0.000 | 23.937 |

| Meridional aspherical data (main scanning direction) | | | |
|---|---|---|---|
| | S1 | S2a/S2b | S3 |
| R | −1.87865E+02 | −1.11089E−02 | −1.87865E+02 |
| K | 3.21792E+00 | −3.70218E+00 | 3.21792E+00 |
| B4 | 7.33497E−07 | 4.41849E−07 | 7.33497E−07 |
| B6 | −9.99172E−11 | −8.92292E−11 | −9.98172E−11 |
| B8 | 8.75288E−15 | 9.69343E−15 | 8.75288E−15 |
| B10 | −5.21212E−18 | −5.37937E−18 | −5.21212E−18 |
| B12 | 0.00000E+00 | 0.00000E+00 | 0.00000E+00 |

| Sagittal line aspherical data (sub-scanning direction) | | | |
|---|---|---|---|
| | S1 | S2a/S2b | S3 |
| r | −2.82207E+01 | 0.00000E+00 | 1.74425E+01 |
| D2 | 5.84405E−05 | 0.00000E+00 | −2.55801E−05 |
| D4 | 1.79623E−09 | 0.00000E+00 | 9.88916E−09 |
| D6 | −9.93102E−11 | 0.00000E+00 | −1.09682E−13 |
| D8 | 1.44190E−13 | 0.00000E+00 | −2.22185E−15 |
| D10 | −8.58876E−17 | 0.00000E+00 | 9.59066E−19 |
| D12 | 1.87750E−20 | 0.00000E+00 | −1.35228E−22 |
| M0_1 | −2.99991E−01 | −1.95739E−02 | 1.28805E−01 |
| M2_1 | 1.61711E−04 | 0.00000E+00 | −6.25371E−06 |
| M4_1 | 2.52967E−07 | 0.00000E+00 | −7.13967E−09 |
| M6_1 | −2.46520E−10 | 0.00000E+00 | 7.76654E−12 |
| M8_1 | 1.04856E−13 | 0.00000E+00 | −1.43711E−15 |
| M10_1 | −4.88881E−18 | 0.00000E+00 | −1.87736E−19 |
| M12_1 | 0.00000E+00 | 0.00000E+00 | −8.75496E−24 |
| M0_3 | 7.02869E−04 | 0.00000E+00 | 0.00000E+00 |
| M2_3 | −2.29155E−06 | 0.00000E+00 | 0.00000E+00 |
| M4_3 | 2.99869E−09 | 0.00000E+00 | 0.00000E+00 |
| M6_3 | −1.38747E−12 | 0.00000E+00 | 0.00000E+00 |

A coordinate origin in the lens configuration shown in Table 1 is denoted by C0 illustrated in FIG. 2B. The origin C0 corresponds to a deflection reflection point of a principal ray of the scanning light beam which scans the image center.

In this embodiment, a meridional line shape of each of the four lens surfaces (lens incidence surface S1, lens exit surface S2a, lens reincidence surface S2b, and lens re-exit surface S3) of the imaging lens 6 is an aspherical shape expressed by a function of up to the tenth order. The surfaces S2a and S2b serve as a single surface defined by the same shape expression. The respective lens surfaces of the imaging lens 6 are defined by the following aspherical expressions based on, as the origins, the positions of the lens configuration shown in Table. 1. For example, in the case of the lens incidence surface S1, coordinates (X, Y, Z)=(45.000, 0.000, 2.358) are set as the origin of the aspherical expression. When a direction of an optical axis passing through the origins of the respective lens surfaces is set as an X-axis and an axis perpendicular to the optical axis in the main scanning section is set as a Y-axis, a surface shape of each of the lens surfaces in a meridional line direction corresponding to the main scanning direction is expressed as follows.

$$X = \frac{Y^2/R}{1+(1-(1+K)(Y/R)^2)^{1/2}} + \quad \text{(Equation 1)}$$
$$B_4Y^4 + B_6Y^6 + B_8Y^8 + B_{10}Y^{10}$$

where R denotes the meridional line curvature radius and K, $B_4$, $B_6$, $B_8$, and $B_{10}$ each denote aspherical surface coefficients.

A surface shape in a sagittal line direction corresponding to the sub-scanning direction is expressed as follows.

$$S = \frac{Z^2/r'}{1+(1-(Z/r')^2)^{1/2}} + \Sigma \; \Sigma M_{j\_k} Y^j Z^k \quad \text{(Equation 2)}$$

Note that S indicates a sagittal line shape which includes a meridional line normal at each position in the meridional line direction and is defined in a plane perpendicular to the main scanning section.

A curvature radius r' in the sub-scanning direction (sagittal line curvature radius) at a distance of Y from the optical axis in the main scanning direction is expressed as follows.

$$1/r' = 1/r + D_2Y^2 + D_4Y^4 + D_6Y^6 + D_8Y^8 + D_{10}Y^{10} + D_{12}Y^{12} \quad \text{(Equation 3)}$$

where r indicates a sagittal line curvature radius on the optical axis and $D_2$, $D_4$, $D_6$, $D_8$, $D_{10}$, and $D_{12}$ indicate sagittal line change coefficients.

In addition, Mj_k indicates a coefficient exhibiting an aspherical surface in the sagittal line direction. For example, Mj_1 indicates a first-order term of Z and exhibits a surface tilt in the sub-scanning direction (sagittal line tilt). In this embodiment, a sagittal line tilt amount is changed in the main scanning direction based on 0-, 2-, 4-, 6-, 8-, 10-, and 12-order coefficients.

In other words, the first transmission surface S1 is a sagittal line tilt change surface in which a tilt angle in the sub-scanning section is changed depending on the main scanning direction. The tilt angle of the sagittal line tilt change surface in the sub-scanning section increases from an on-axis to an off-axis in the main scanning direction.

In addition, Mj_3 indicates a coefficient exhibiting an aspherical surface asymmetrical in the sub-scanning direction and is used to correct coma in the sub-scanning direction which is caused in a case where a light beam obliquely passes through a lens surface in the sub-scanning section.

In other words, the first transmission surface S1 is a sagittal line aspherical surface in which a surface in the sub-scanning section has an aspherical shape. An aspherical amount of the sagittal line aspherical surface reduces from the on-axis to the off-axis in the main scanning direction.

In this embodiment, as shown in Table 1, a surface of the imaging lens 6 which is located on the optical deflector 5 side (deflection unit side) is the sagittal line aspherical surface in which the surface in the sub-scanning section has the aspherical shape. In this embodiment, at least one sagittal line aspherical surface may be provided (two surfaces S1 and S3 are provided in this embodiment).

In this embodiment, as shown in Table 1, the lens incidence surface S1 and the lens re-exit surface S3 of the imaging lens 6 which are located on the optical deflector 5 side have the same shape in the main scanning direction, and are multistage toric surfaces in which shapes in the sub-scanning direction are different from each other.

Even when the same aspherical coefficients in the main scanning direction are set, the shapes in the sub-scanning direction are different from each other, and hence some degree of step occurs in an boundary portion between the surfaces S1 and S3. When the imaging lens 6 is to be produced by injection molding, it is likely to cause a surface sink in the vicinity of the step. Therefore, it is necessary to set approximately 1.5 mm as a sub-scanning interval between a marginal ray of the incident light beam and a marginal ray of the exit light beam on the multistage toric surface side. In this embodiment, the function of the surface shape is defined by the definition expressions as described above. However, the scope of the present invention is not limited to this.

In this embodiment, an infrared light source having a light beam oscillation wavelength λ of 790 nm is used as the light source unit 1. A proportional coefficient κ (Y=κθ) with respect to an image height Y and a deflection reflection angle θ is equal to 180 (rad/mm).

Figure 3A:
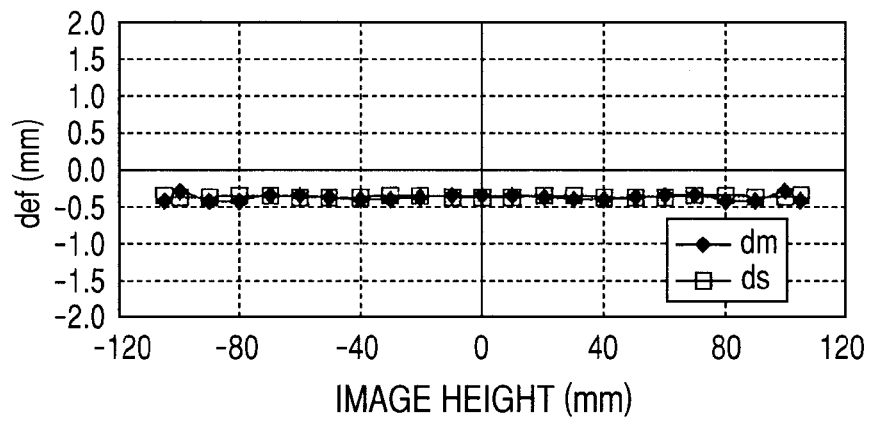
FIG. 3A is a graph illustrating curvatures of field according to the first embodiment of the present invention.

FIG. 3A is a graph illustrating curvatures of field in the main scanning direction and the sub-scanning direction, according to the first embodiment of the present invention. In FIG. 3A, dm indicates the curvature of field in the main scanning direction and ds indicates the curvature of field in the sub-scanning direction. In a case of an effective image width (W=210 mm), the curvature of field in the main scanning direction is 0.16 mm and the curvature of field in the sub-scanning direction is 0.05 mm. Therefore, it is apparent that both the curvatures of field are appropriately reduced.

Figure 3B:
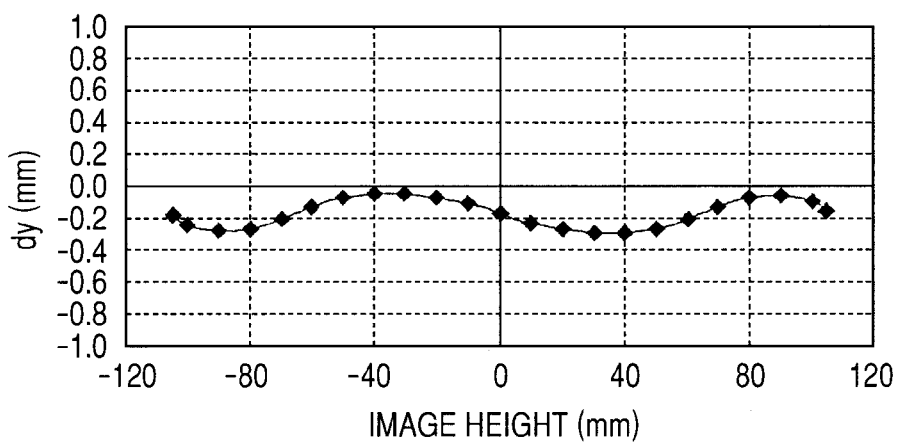
FIG. 3B is a graph illustrating an fθ characteristic.

FIG. 3B is a graph illustrating an fθ characteristic according to the first embodiment of the present invention. FIG. 3B illustrates a difference between an actual position that a light beam actually reaches and an ideal image height. A maximum deviation is 0.13 mm. The value may be a little large in a sense of normal use. However, when an image clock is changed based on each image height, the fθ characteristic may be reduced. Note that, when the deviation of the fθ characteristic is too large, a spot diameter in the main scanning direction changes. This embodiment exhibits an fθ characteristic in which the spot diameter affecting a latent image depth is at a sufficiently problem-free level.

Figure 3C:
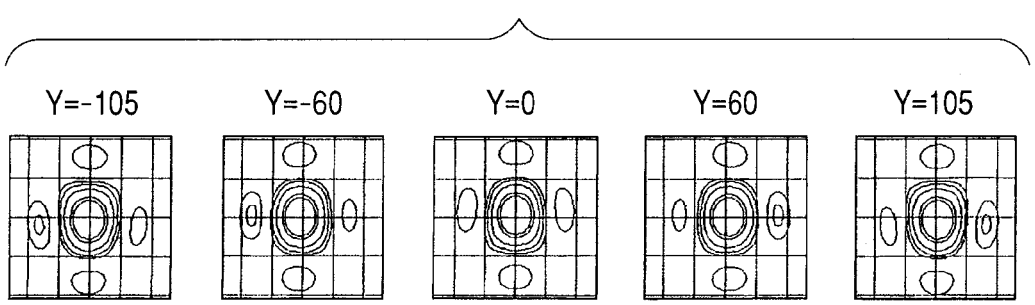
FIG. 3C is an explanatory diagram illustrating a spot profile.

FIG. 3C is an explanatory diagram illustrating spot sectional shapes at respective image heights. FIG. 3C illustrates cross sections obtained by slicing in 2%, 5%, 10%, 13.5%, 36.8%, and 50% of a spot peak light amount at the respective image heights.

In an optical scanning apparatus in which a light beam obliquely enters the deflection surface of the optical deflector in the sub-scanning section, there generally occurs a phenomenon in which a spot rotates due to a twist of wavefront aberration. In this embodiment, the power configuration for each surface, the lens tilt amount, and the shift amount are optimized, to thereby reduce the twist of wavefront aberration. In particular, the surface tilt angle (sagittal line tilt amount) in the sub-scanning direction is changed into the main scanning direction on the two surfaces, that is, the lens incidence surface S1 and the lens re-exit surface S3, so that the spot rotation due to the twist of wavefront aberration and bending of the scanning line described below may be simultaneously and appropriately corrected.

Hereinafter, a surface in which the surface tilt angle (sagittal line tilt amount) in the sub-scanning direction is changed according to a position in the main scanning direction is also referred to as the "sagittal line tilt change surface". In this embodiment, as described above, each of the two surfaces (surfaces S1 and S3) is formed as the sagittal line tilt change surface on the optical deflector 5 side (deflection unit side) of the imaging lens 6.

The surface in which the sagittal line tilt amount is changed into the main scanning direction may be also introduced for the surfaces S2a and S2b. However, the light beam is not sufficiently separated on the surfaces S2a and S2b. Therefore, the surface in which the sagittal line tilt amount is changed into the main scanning direction is effectively introduced for the surfaces S1 and S3 on which the light beam is sufficiently separated.

Figure 4A:
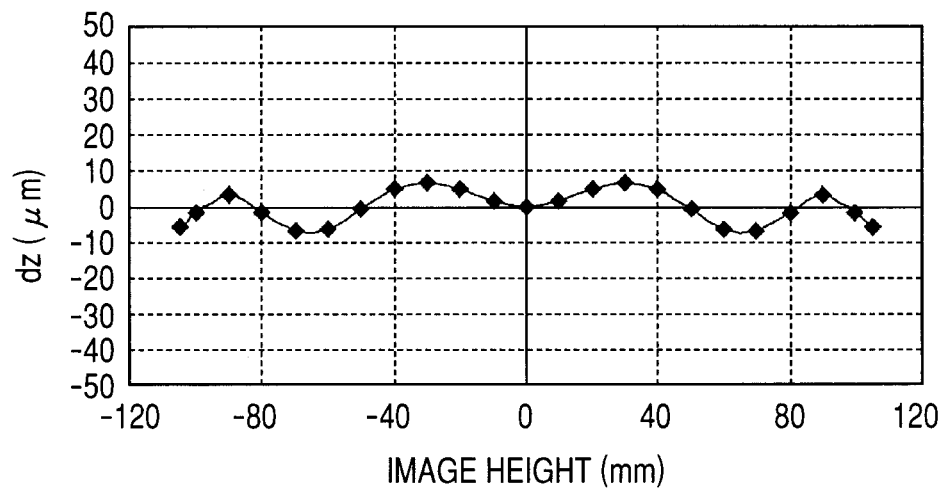
FIG. 4A is a graph illustrating bending of a scanning line according to the first embodiment of the present invention and FIG. 4B is a graph illustrating a change of a tilt angle in sub-scanning of a surface of an imaging lens for scanning.

FIG. 4A is a graph illustrating the bending of the scanning line reaching the surface to be scanned according to the first embodiment of the present invention. In a case of a monochrome image forming apparatus, the bending of the scanning line is normally required to be within 0.2 mm. In this embodiment, the bending of the scanning line is suppressed to 13.6 µm, which is at a problem-free level for use in a color apparatus.

(Effect of this Embodiment)

Next, an effect of a scanning light beam refractive action (upward beam bending) on the lens incidence surface S1, which is an essential part of the present invention, is described with reference to FIGS. 1 and 2B.

In this embodiment, assume that "n" indicates a refractive index of a material of the imaging optical element (imaging lens) 6. Assume that $\gamma(°)$ (gamma) indicates an angle defined in the sub-scanning section and between a direction of a principal ray $L_0$ of a light beam which is deflected for scanning by the optical deflector 5 and scans the scanning center in the main scanning direction, and a normal (chain line) $H_{S1}$ to the lens incidence surface S1 at an intersection of the direction of the principal ray $L_0$ and the lens incidence surface S1 of the imaging lens 6. Assume that $\gamma'(°)$ indicates an angle defined in the sub-scanning section and between a direction of the principal ray $L_0$ of the light beam refracted at the surface S1 and the normal (chain line) $H_{S1}$ to the surface S1. In this case, the following condition is satisfied.

$$0.5° < \gamma - \gamma' < 10° \quad (1)$$

Conditional Expression (1) relates to the scanning light beam refractive action (upward beam bending) on the lens incidence surface S1. Under the lower limit value of Conditional Expression (1), it is necessary to significantly tilt the plane mirror 7, to thereby separate the light beam, but a distance between the deflection reflection point C0 and the surface to be scanned 8 or the height of the optical scanning apparatus in the sub-scanning direction lengthens, which is not desirable. Over the upper limit value of Conditional Expression (1), it is difficult to correct coma caused by significantly tilting the surface S1, which is not desirable.

In this embodiment, the angle $\gamma(°)$ is as follows.

$$\gamma = 13.7°$$

The refractive index "n" of the imaging lens 6 is equal to 1.52781, and hence the angle $\gamma'$ is as follows.

$$\gamma' = 8.92°$$

Therefore, the light beam is bent upward at the surface S1 (refractive action of scanning light beam) by the following value.

$$\gamma - \gamma' = \gamma - A\sin(\sin \gamma/n) = 4.78°$$

This satisfies Conditional Expression (1) described above. The numerical range of Conditional Expression (1) is desirably set as follows.

$$2.7° < \gamma - \gamma' < 9.0° \quad (1a)$$

Assume that $\phi(°)$ (phi) indicates an angle defined in the sub-scanning section and between the direction of the principal ray $L_0$ of the light beam which is deflected by the optical deflector 5 and enters the scanning center in the main scanning section, and a direction of a principal ray $L_{00}$ of the light beam which is turned back by the plane mirror 7 and exits from the lens re-exit surface S3 of the imaging lens 6. In this case, the following condition is satisfied.

$$5° < \phi < 15° \quad (2)$$

Conditional Expression (2) is a condition for specifying the angle $\phi$. When Conditional Expression (2) is satisfied, the optical scanning apparatus may be made compact in the sub-scanning direction as illustrated in FIG. 2B, and the distance between the deflection reflection point C0 and the surface to be scanned 8 in the sub-scanning direction may be shortened.

In this embodiment, the angle $\phi(°)$ is as follows.

$$\phi = 9.80°$$

This satisfies Conditional Expression (2).

In this embodiment, a distance Ha (mm) between the deflection reflection point C0 and the surface to be scanned 8 in the sub-scanning direction and a height Hb (mm) of the optical scanning apparatus (case 13) in the sub-scanning direction are as follows.

$$Ha = 23.9 \text{ mm}$$

$$Hb = 29 \text{ mm}$$

Therefore, the entire apparatus may be made more compact than in a comparative example described later. The numerical range of Conditional Expression (2) is desirably set as follows.

$$5.5° < \phi < 13.5° \quad (2a)$$

Assume that $\alpha(°)$ indicates an absolute value of an angle defined in the sub-scanning section and between the deflection surface 5a of the optical deflector 5 and the reflection surface (mirror surface) 7a of the plane mirror 7 in the case where a light beam scans the scanning center in the main scanning section. In this case, the following condition is satisfied.

$$\alpha < 3° \quad (3)$$

Conditional Expression (3) is a condition for specifying the angle $\alpha$. When Conditional Expression (3) is satisfied, the light beam may be easily separated on the multistage toric surface side without significantly tilting the plane mirror 7, and hence a compact optical scanning apparatus may be realized.

In this embodiment, the angle $\alpha(°)$ is as follows.

$$\alpha = 0°$$

This satisfies Conditional Expression (3).

In this embodiment, as described above, the plane mirror 7 is provided parallel to the rotation axis of the optical deflector 5 ($\alpha = 0°$), and the light beam is significantly bent upward at the surface S1. Therefore, even when the mirror is not tilted, the light beam is easily separated on the multistage toric surface side. The numerical range of Conditional Expression (3) is desirably set as follows.

$$\alpha < 2.5° \quad (3a)$$

Figure 4B:
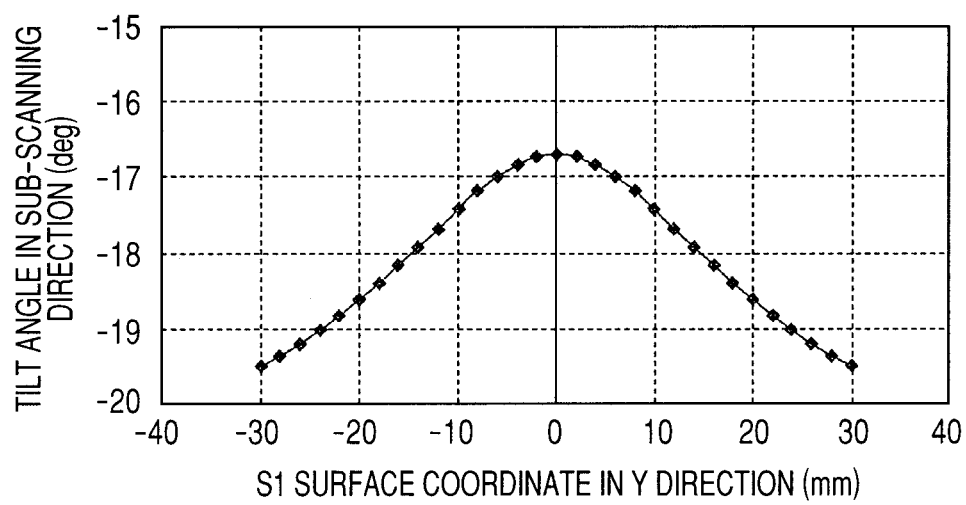

As illustrated in FIG. 4B, the surface S1 is changed so that the absolute value of the tilt angle in the sub-scanning direction increases from the on-axis to the off-axis. Therefore, the light beam separation resulting from the upward bending of the light beam, the correction of twist of wavefront aberration, and bending of the scanning line as described above are simultaneously achieved.

In other words, the first transmission surface S1 is the sagittal line tilt change surface in which the tilt angle in the sub-scanning section is changed depending on the main scanning direction. The tilt angle of the sagittal line tilt change surface in the sub-scanning section increases from the on-axis to the off-axis in the main scanning direction.

The surface S1 is significantly tilted in the sub-scanning direction, and hence coma occurs in the sub-scanning section. Therefore, a three-order aspherical surface is used in the sagittal line direction to appropriately correct the coma in the sub-scanning direction as illustrated in FIG. 3C. An effect can be obtained by providing the three-order aspherical surface is provided for any of the lens surfaces. It is most effective to use the three-order aspherical surface for the surface S1 significantly tilted relative to the incident light beam in the sub-scanning direction.

In other words, the first transmission surface S1 is the sagittal line aspherical surface in which the surface in the sub-scanning section has the aspherical shape. An aspherical amount of the sagittal line aspherical surface reduces from the on-axis to the off-axis in the main scanning direction.

(Description of Comparative Example)

Figure 5A:
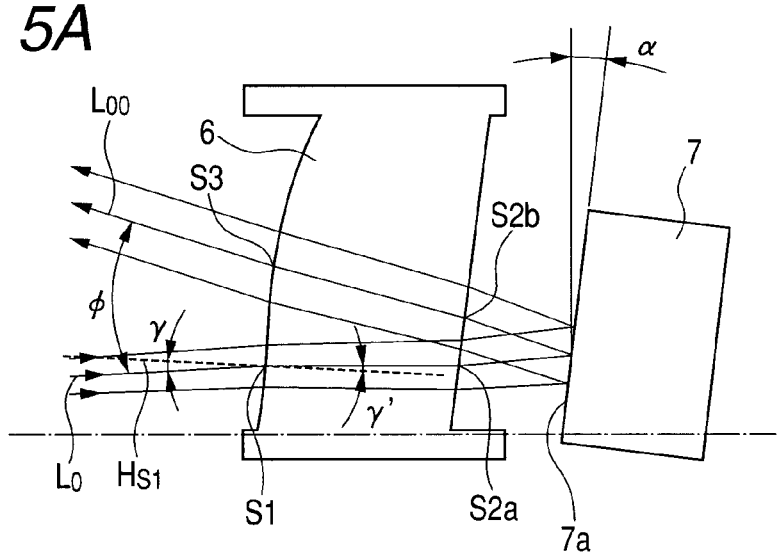
FIG. 5A is a sub-scanning cross sectional view illustrating an imaging optical system according to a comparative example and FIG. 5B is a sub-scanning cross sectional view illustrating an optical scanning apparatus according to the comparative example.
Figure 5B:
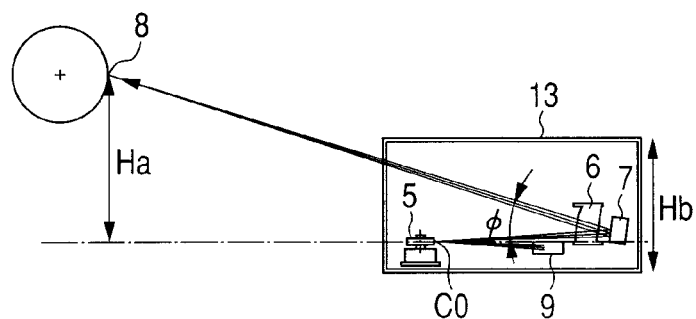

Next, an example of an imaging optical system which is designed as a comparative example is described. FIG. 5A is a sub-scanning sectional view illustrating an imaging optical system according to the comparative example. FIG. 5B is a sub-scanning cross sectional view illustrating an optical scanning apparatus according to the comparative example. A main scanning cross sectional view is substantially the same as that in the first embodiment and thus omitted here. In FIGS. 5A and 5B, the same components as illustrated in FIGS. 1 and 2B are denoted by the same reference symbols.

Table 2 shows lens surface shapes and an optical configuration in the comparative example. Aspherical shape expressions and the setting of origins of lens surfaces are the same as those in the first embodiment.

TABLE 2

Design Data

| Used wavelength | λ(nm) | 790 |
|---|---|---|
| Lens refractive index | n | 1.52781 |
| Main scanning laser incident angle (degrees) |  | 0 |
| Sub-scanning laser incident angle (degrees) |  | 3 |
| Maximum light beam exit angle (degrees) |  | ±33.423 |
| Polygon rotation center coordinates (mm) | Y-direction | 0.000 |
|  | X-direction | −4.157 |
| The number of polygon surfaces |  | 8 |
| Polygon circumcircle diameter (mm) |  | φ9 |
| Mirror tilt angle (degrees) | α | 7 |
| Effective scanning width | W | 210 |
| fθ coefficient | κ(rad/mm) | 180 |

Lens Configuration

|  | X-direction | Y-direction | Z-direction |
|---|---|---|---|
| Lens incidence surface S1 | 45.000 | 0.000 | 2.358 |
| Lens exit surface S2a | 51.500 | 0.000 | 0.000 |
| Mirror surface 7 | 55.500 | 0.000 | 0.000 |
| Lens reincidence surface S2b | 51.500 | 0.000 | 0.000 |
| Lens re-exit surface S3 | 44.300 | 0.000 | 1.500 |
| Surface to be scanned 8 | −101.623 | 0.000 | 51.929 |

Meridional aspherical data (main scanning direction)

|  | S1 | S2a/S2b | S3 |
|---|---|---|---|
| R | −1.76221E+02 | −1.05785E+02 | −1.76221E+02 |
| K | 3.99426E+00 | −2.71685E+00 | 3.99426E+00 |

TABLE 2-continued

Design Data

| B4 | 7.83038E−07 | 4.12944E−07 | 7.83038E−07 |
| B6 | −9.59527E−11 | −3.97556E−11 | −9.59527E−11 |
| B8 | 1.77534E−14 | 2.63686E−15 | 1.77534E−14 |
| B10 | −5.02914E−18 | −4.86017E−18 | −5.02914E−18 |
| B12 | 0.00000E+00 | 0.00000E+00 | 0.00000E+00 |

Sagittal line aspherical data (sub-scanning direction)

|  | S1 | S2a/S2b | S3 |
|---|---|---|---|
| r | −2.96986E+01 | 0.00000E+00 | 1.85511E+01 |
| D2 | 5.92926E−05 | 0.00000E+00 | −2.30928E−05 |
| D4 | 4.07798E−09 | 0.00000E+00 | 7.66375E−09 |
| D6 | −1.13588E−10 | 0.00000E+00 | 1.49828E−12 |
| D8 | 1.53286E−13 | 0.00000E+00 | −2.60147E−15 |
| D10 | −7.38407E−17 | 0.00000E+00 | 8.50614E−19 |
| D12 | 7.34970E−21 | 0.00000E+00 | −6.52259E−23 |
| M0_1 | 8.00000E−02 | 1.30079E−01 | −7.01997E−02 |
| M2_1 | −9.92914E−05 | 0.00000E+00 | 6.74571E−05 |
| M4_1 | 2.45394E−07 | 0.00000E+00 | −4.40408E−08 |
| M6_1 | −3.31222E−10 | 0.00000E+00 | 1.44489E−11 |
| M8_1 | 2.13910E−13 | 0.00000E+00 | 6.98093E−17 |
| M10_1 | −4.63151E−17 | 0.00000E+00 | −7.13835E−19 |
| M12_1 | 0.00000E+00 | 0.00000E+00 | 0.00000E+00 |
| M0_3 | 1.79712E−04 | 0.00000E+00 | 0.00000E+00 |
| M2_3 | −4.21591E−07 | 0.00000E+00 | 0.00000E+00 |
| M4_3 | 4.40125E−10 | 0.00000E+00 | 0.00000E+00 |
| M6_3 | −1.98059E−13 | 0.00000E+00 | 0.00000E+00 |

In the comparative example, the angle $\gamma(°)$ defined in the sub-scanning section and between the direction of the principal ray $L_0$ of the light beam entering the surface S1 and the normal (chain line) $H_{S1}$ to the surface S1 is as follows.

$$\gamma = -7.57°$$

Assume that $\gamma'(°)$ indicates the angle defined in the sub-scanning section and between a direction of the principal ray $L_0$ of the light beam refracted at the surface S1 and the normal (chain line) $H_{S1}$ to the surface S1. The refractive index "n" of the imaging lens 6 is equal to 1.52781, and hence the angle $\gamma'$ is as follows.

$$\gamma' = -4.95°$$

Therefore, the light beam is bent upward at the surface S1 (refractive action of scanning light beam) by the following value.

$$\gamma - \gamma' = \gamma - A\sin(\sin \gamma/n) = -2.62°$$

In the comparative example, when $\alpha(°)$ indicates the absolute value of the angle defined in the sub-scanning section and between the deflection surface 5a of the optical deflector 5 and the reflection surface (mirror surface) 7a of the plane mirror 7, the plane mirror 7 is significantly tilted by $\alpha$ (=7°) to achieve the light beam separation on the multistage toric surface side. Therefore, as is apparent from FIG. 5B, when the plane mirror 7 is designed to be significantly tilted, the distance between the deflection reflection point C0 and the surface to be scanned 8 in the sub-scanning direction and the height of the optical scanning apparatus in the sub-scanning direction increase.

To be specific, the distance Ha (mm) between the deflection reflection point C0 and the surface to be scanned 8 in the sub-scanning direction and the height Hb (mm) of the optical scanning apparatus (case 13) in the sub-scanning direction are as follows.

Ha=51.9 mm

Hb=41 mm

As compared with the first embodiment, the height Ha is increased by 28 mm and the height Hb is increased by 12 mm.

In this embodiment, the lens incidence surface S1 of the imaging lens 6 is tilted in the sub-scanning direction within the range specified by Conditional Expression (1) as described above, to thereby sufficiently separate the light beam in the sub-scanning direction on the multistage toric surface of the imaging lens 6. In addition, in this embodiment, the height of the optical scanning apparatus in the sub-scanning direction may be reduced, as described above, as compared with the comparative example in which the plane mirror 7 is significantly tilted.

(Second Embodiment)

Figure 6:
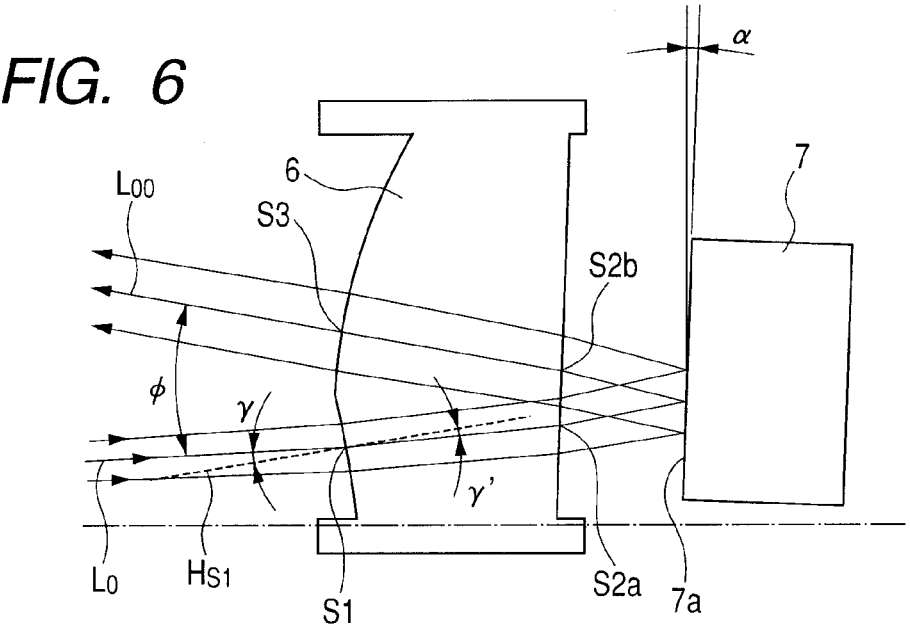
FIG. 6 is a sub-scanning cross sectional view illustrating an imaging optical system according to a second embodiment of the present invention.
Figure 7A:
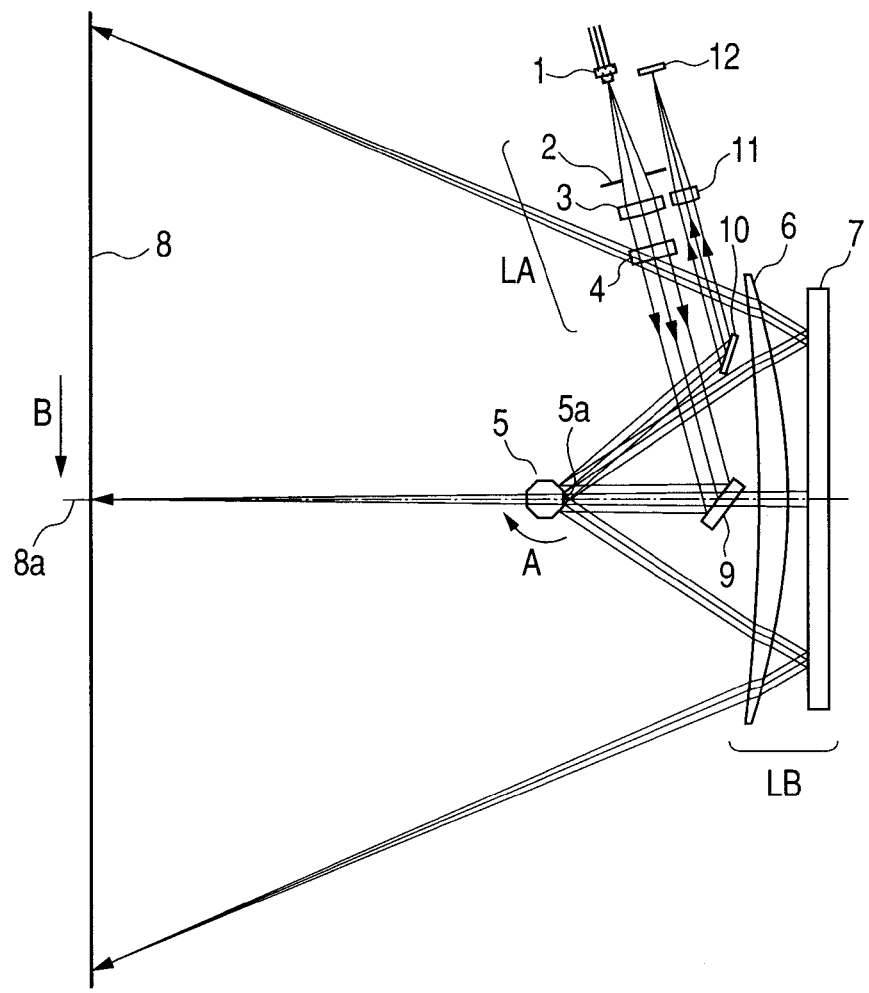
FIG. 7A is a main scanning cross sectional view illustrating an optical scanning apparatus according to the second embodiment of the present invention and FIG. 7B is a sub-scanning cross sectional view illustrating the optical scanning apparatus according to the second embodiment of the present invention.
Figure 7B:
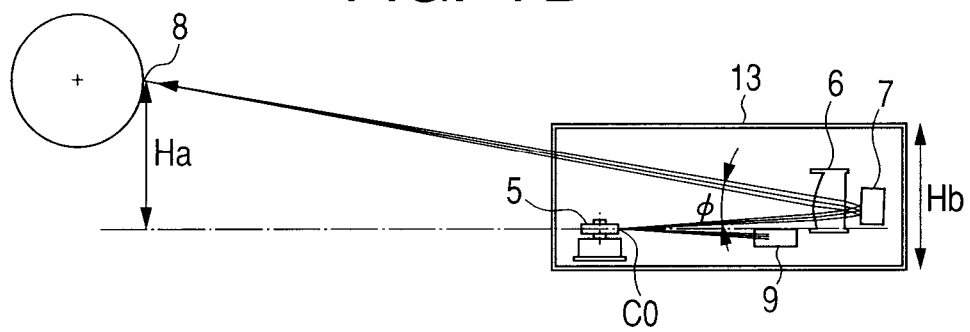

FIG. 6 is a cross sectional view illustrating a main portion of an imaging optical system in a sub-scanning direction (sub-scanning sectional view), the imaging optical system being used for an optical scanning apparatus according to a second embodiment of the present invention. FIG. 7A is a cross sectional view illustrating a main portion of the optical scanning apparatus in a main scanning direction (main scanning sectional view) according to the second embodiment of the present invention. FIG. 7B is a cross sectional view illustrating the optical scanning apparatus in the sub-scanning direction (sub-scanning sectional view) according to the second embodiment of the present invention. In FIGS. 6, 7A, and 7B, the same components as illustrated in FIGS. 1, 2A, and 2B are denoted by the same reference symbols.

This embodiment is different from the first embodiment described above in that the effect of upward bending of the light beam (refractive action of light beam) at the surface S1 is slightly reduced. The other structures and optical actions are the same as those in the first embodiment, and hence the same effect is obtained.

Even in this embodiment, as in the first embodiment, the light beam enters (frontally enters) the deflection surface 5a at the middle or substantially middle of the deflection angle of the optical deflector 5 in the main scanning section. In the sub-scanning section, the light beam enters (obliquely enters) the deflection surface 5a at a predetermined angle relative to the sub-scanning direction (3° relative to normal to deflection surface). Table 3 shows lens surface shapes and an optical configuration in this embodiment.

TABLE 3

| Design Data | | |
|---|---|---|
| Used wavelength | λ(nm) | 790 |
| Lens refractive index | n | 1.52781 |
| Main scanning laser incident angle (degrees) | | 0 |
| Sub-scanning laser incident angle (degrees) | | 3 |
| Maximum light beam exit angle (degrees) | | ±33.423 |
| Polygon rotation center coordinates (mm) | Y-direction | 0.000 |
| | X-direction | −4.157 |
| The number of polygon surfaces | | 8 |
| Polygon circumcircle diameter (mm) | | φ9 |
| Mirror tilt angle (degrees) | α | 2 |
| Effective scanning width | W | 210 |
| fθ coefficient | κ(rad/mm) | 180 |

| Lens Configuration | | | |
|---|---|---|---|
| | X-direction | Y-direction | Z-direction |
| Lens incidence surface S1 | 45.000 | 0.000 | 2.358 |
| Lens exit surface S2a | 51.500 | 0.000 | 0.000 |

TABLE 3-continued

| Design Data | | | |
|---|---|---|---|
| Mirror surface 7 | 55.500 | 0.000 | 0.000 |
| Lens reincidence surface S2b | 51.500 | 0.000 | 0.000 |
| Lens re-exit surface S3 | 44.700 | 0.000 | 5.000 |
| Surface to be scanned 8 | −106.883 | 0.000 | 32.914 |

| Meridional aspherical data (main scanning direction) | | | |
|---|---|---|---|
| | S1 | S2a/S2b | S3 |
| R | −1.86494E+02 | −1.10323E+02 | −1.86494E+02 |
| K | 3.78954E+00 | −3.58027E+00 | 3.78954E+00 |
| B4 | 7.33045E−07 | 4.00842E−07 | 7.33045E−07 |
| B6 | −9.77427E−11 | −8.57307E−11 | −9.77427E−11 |
| B8 | 7.54120E−15 | 9.80515E−15 | 7.54120E−16 |
| B10 | −4.89980E−18 | −6.02929E−18 | −4.89980E−18 |
| B12 | 0.00000E+00 | 0.00000E+00 | 0.00000E+00 |

| Sagittal line aspherical data (sub-scanning direction) | | | |
|---|---|---|---|
| | S1 | S2a/S2b | S3 |
| r | −3.17900E+01 | 0.00000E+00 | 1.73751E+01 |
| D2 | 5.68832E−05 | 0.00000E+00 | −2.58029E−05 |
| D4 | −2.31412E−09 | 0.00000E+00 | 1.02975E−08 |
| D6 | −1.01669E−10 | 0.00000E+00 | −2.08737E−13 |
| D8 | 1.57108E−13 | 0.00000E+00 | −2.23341E−15 |
| D10 | −8.85709E−17 | 0.00000E+00 | 8.90175E−19 |
| D12 | 1.40096E−20 | 0.00000E+00 | −1.04308E−22 |
| M0_1 | −1.96700E−01 | 3.34293E−02 | 1.08127E−01 |
| M2_1 | −1.49747E−04 | 0.00000E+00 | 9.27030E−06 |
| M4_1 | 2.61643E−07 | 0.00000E+00 | −1.63294E−08 |
| M6_1 | −2.83834E−10 | 0.00000E+00 | 9.39993E−12 |
| M8_1 | 1.45790E−13 | 0.00000E+00 | −6.85403E−16 |
| M10_1 | −2.07180E−17 | 0.00000E+00 | −3.16639E−19 |
| M12_1 | 0.00000E+00 | 0.00000E+00 | −5.98701E−23 |
| M0_3 | 7.14503E−04 | 0.00000E+00 | 0.00000E+00 |
| M2_3 | −2.15485E−06 | 0.00000E+00 | 0.00000E+00 |
| M4_3 | 2.73237E−09 | 0.00000E+00 | 0.00000E+00 |
| M6_3 | −1.27035E−12 | 0.00000E+00 | 0.00000E+00 |

Note that the aspherical shape expressions used in this embodiment and the setting of origins of lens surfaces are the same as in the first embodiment.

In this embodiment, the meridional line shape of each of the four lens surfaces (lens incidence surface S1, lens exit surface S2a, lens reincidence surface S2b, and lens re-exit surface S3) of the imaging lens 6 is formed in an aspherical shape expressed by the function of up to the tenth order. The surfaces S2a and S2b serve as a single surface defined by the same shape expression.

Even in this embodiment, as shown in Table 3, the multistage toric surface is employed in which the lens incidence surface S1 and the lens re-exit surface S3 which are located on the optical deflector 5 side of the imaging lens 6 have the same shape in the main scanning direction and are different in shape from each other in the sub-scanning direction. Even in this embodiment, as in the first embodiment, the sub-scanning interval between the marginal ray of the incident light beam and the marginal ray of the exit light beam on the multistage toric surface side is set to approximately 1.5 mm. In this embodiment, the infrared light source having the light beam oscillation wavelength λ of 790 nm is used as the light source unit 1. The proportional coefficient κ (Y=κθ) with respect to the image height Y and the deflection reflection angle θ is equal to 180 (rad/mm).

Figure 8A:
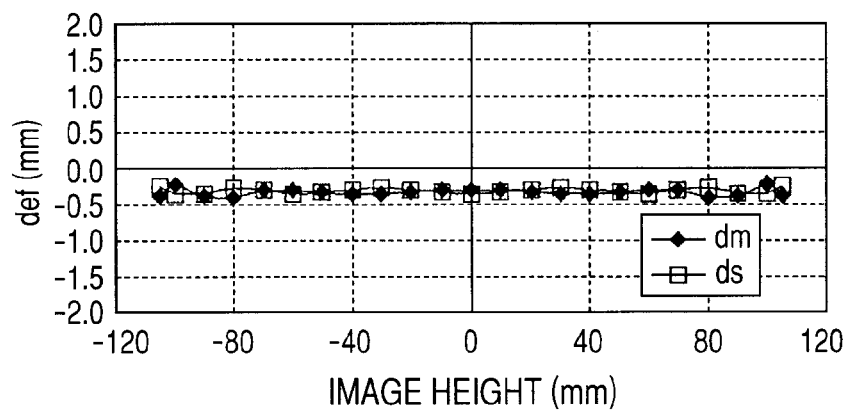
FIG. 8A is a graph illustrating curvatures of field according to the second embodiment of the present invention.

FIG. 8A is a graph illustrating curvatures of field in the main scanning direction and the sub-scanning direction, according to the second embodiment of the present invention. In FIG. 8A, dm indicates the curvature of field in the main scanning direction and ds indicates the curvature of field in the sub-scanning direction. In a case of an effective image width (W=210 mm), the curvature of field in the main scanning direction is 0.17 mm and the curvature of field in the sub-scanning direction is 0.11 mm. Therefore, it is apparent that both the curvatures of field are appropriately reduced.

Figure 8B:
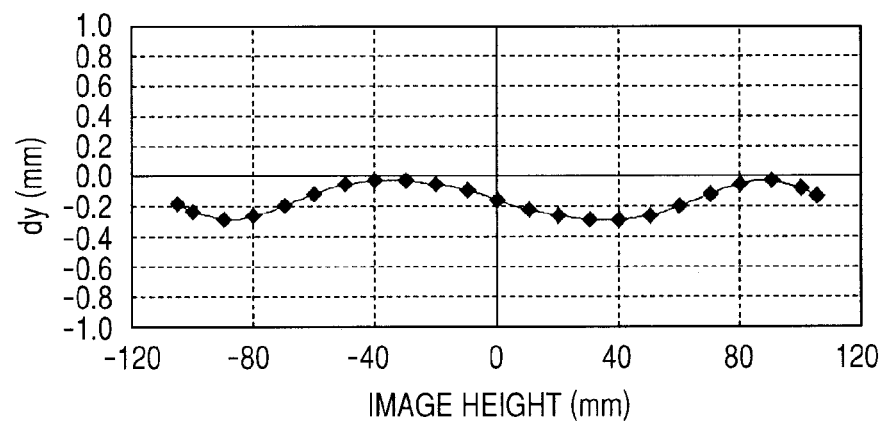
FIG. 8B is a graph illustrating an fθ characteristic.

FIG. 8B is a graph illustrating an fθ characteristic according to the second embodiment of the present invention. FIG. 8B illustrates a difference between an actual position that a light beam actually reaches and an ideal image height. A maximum deviation is 0.136 mm. The value may be a little large in a sense of normal use. However, when an image clock is changed based on each image height, the fθ characteristic may be reduced. Note that, when the deviation of the fθ characteristic is too large, a spot diameter in the main scanning direction changes.

This embodiment exhibits an fθ characteristic in which the spot diameter affecting a latent image depth is at a sufficiently problem-free level.

Figure 8C:
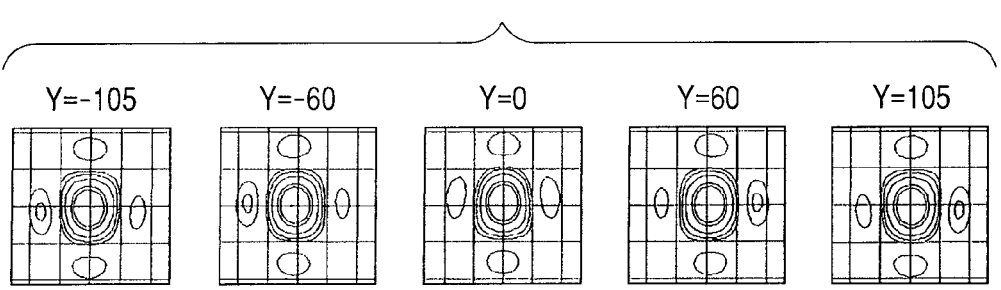
FIG. 8C is an explanatory diagram illustrating a spot profile.

FIG. 8C is an explanatory diagram illustrating spot sectional shapes at respective image heights. FIG. 8C illustrates cross sections obtained by slicing in 2%, 5%, 10%, 13.5%, 36.8%, and 50% of a spot peak light amount at the respective image heights.

In an optical scanning apparatus in which a light beam obliquely enters in the sub-scanning section, there generally occurs a phenomenon in which a spot rotates due to a twist of wavefront aberration. In this embodiment, the power configuration for each surface, the lens tilt amount, and the shift amount are optimized, to thereby reduce the twist of wavefront aberration. In particular, the surface tilt angle (sagittal line tilt amount) in the sub-scanning direction is changed into the main scanning direction on the two surfaces, that is, the lens incidence surface S1 and the lens re-exit surface S3, so that the spot rotation due to the twist of wavefront aberration and bending of the scanning line described below may be simultaneously and appropriately corrected.

The surface in which the sagittal line tilt amount is changed into the main scanning direction may be also introduced for the surfaces S2$a$ and S2$b$. However, the light beam is not sufficiently separated on the surfaces S2$a$ and S2$b$. Therefore, the surface in which the sagittal line tilt amount is changed into the main scanning direction is effectively introduced for the surfaces S1 and S3 on which the light beam is sufficiently separated.

Figure 9A:
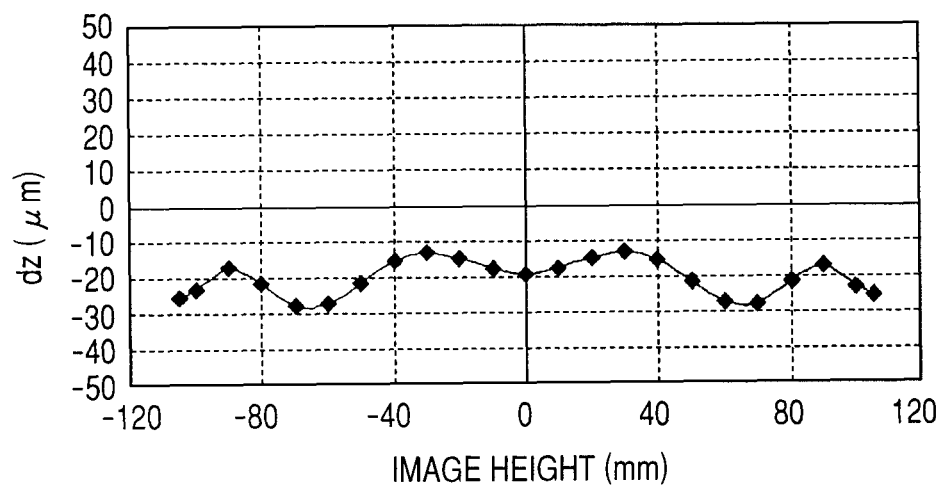
FIG. 9A is a graph illustrating bending of the scanning line according to the second embodiment of the present invention and FIG. 9B is a graph illustrating a change of the tilt angle in sub-scanning of a surface of an imaging lens for scanning.

FIG. 9A is a graph illustrating the bending of the scanning line reaching the surface to be scanned according to the second embodiment of the present invention. In a case of a monochrome image forming apparatus, the bending of the scanning line is normally required to be within 0.2 mm. In this embodiment, the bending of the scanning line is suppressed to 14.6 μm, which is at a problem-free level even for use in a color apparatus.

Next, an effect of a scanning light beam refractive action (upward beam bending) on the lens incidence surface S1, which is an essential part of the present invention, is described with reference to FIGS. 6 and 7B.

In this embodiment, the angle $\gamma(°)$ defined in the sub-scanning section and between the direction of the principal ray $L_0$ of the light beam entering the surface S and the normal (chain line) $H_{S1}$ to the surface S1 is as follows.

$\gamma=8.13°$

Assume that $\gamma'(°)$ indicates the angle defined in the sub-scanning section and between the direction of the principal ray $L_0$ of the light beam refracted at the surface S1 and the normal (chain line) $H_{S1}$ to the surface S1. The refractive index "n" of the imaging lens 6 is equal to 1.52781, and hence the angle $\gamma'$ is as follows.

$\gamma'=5.31°$

Therefore, the light beam is bent upward at the surface S1 (refractive action of scanning light beam) by the following value.

$\gamma-\gamma'=\gamma-A\sin(\sin\gamma/n)=2.82°$

Thus, the effect of upward bending of the light beam at the surface S1 of the imaging lens 6 is slightly reduced, as compared with the first embodiment.

In this embodiment, in order to satisfy Conditional Expression (3), the absolute value of the angle ($\alpha(°)$) defined in the sub-scanning section and between the deflection surface 5$a$ of the optical deflector 5 and the reflection surface 7$a$ of the plane mirror 7 is set to 2° so that the plane mirror 7 is tilted upward. The surface S1 is tilted in the sub-scanning direction, and hence the light beam separation on the multistage toric surface side may be achieved by tilting the plane mirror 7 slightly in the sub-scanning direction.

Figure 9B:
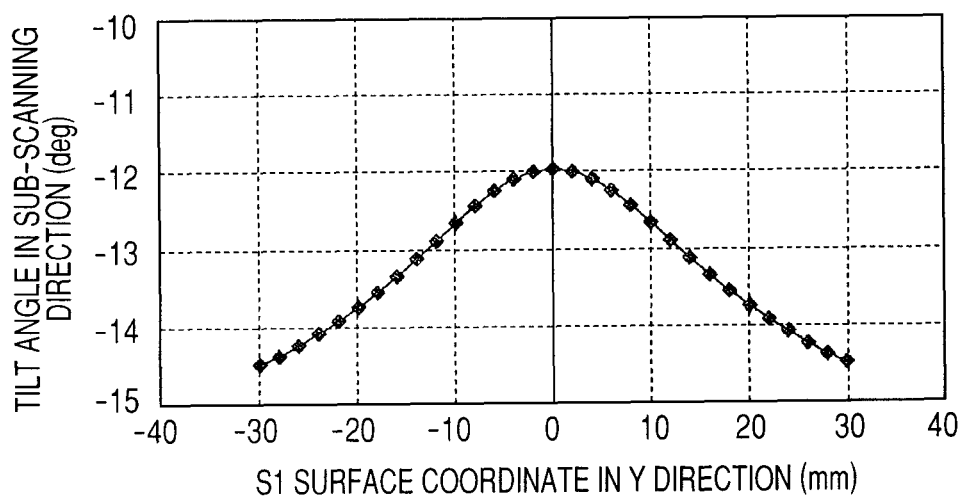

As illustrated in FIG. 9B, the surface S1 is changed so that the absolute value of the tilt angle in the sub-scanning direction increases from the on-axis to the off-axis. Therefore, the light beam separation resulting from the upward bending of the light beam and the correction of the twist of wavefront aberration and the bending of the scanning line as described above are simultaneously achieved.

The surface S1 is significantly tilted in the sub-scanning direction, and hence coma is caused in the sub-scanning section. Therefore, the three-order aspherical surface is used in the sagittal line direction, to thereby appropriately correct the coma in the sub-scanning direction as illustrated in FIG. 8C. The three-order aspherical surface may be provided for any of the lens surfaces to obtain an effect. The three-order aspherical surface may be most effectively adopted for the surface S1 which is significantly tilted relative to the incident light beam in the sub-scanning direction.

The angle $\phi(°)$ defined in the sub-scanning section and between the direction of the principal ray $L_0$ of the light beam which is deflected for scanning by the optical deflector 5 and scans the scanning center in the main scanning section, and a direction of the principal ray $L_{00}$ of the light beam which is turned back by the plane mirror 7 and exited from the surface S3 of the imaging lens 6 is as follows.

$\phi=13.11°$

This satisfies Conditional Expression (2).

When Conditional Expression (2) is satisfied, the optical scanning apparatus may be made compact in the sub-scanning direction as illustrated in FIG. 7B, and the distance between the deflection reflection point C0 and the surface to be scanned 8 in the sub-scanning direction may be reduced.

In this embodiment, a distance Ha (mm) between the deflection reflection point C0 and the surface to be scanned 8 in the sub-scanning direction and a height Hb (mm) of the optical scanning apparatus (case 13) in the sub-scanning direction are as follows.

Ha=32.9 mm

Hb=33 mm

Therefore, the entire apparatus may be made more compact than in the above-mentioned comparative example.

As described above, in this embodiment, the effect of upward bending of the light beam at the surface S1 of the imaging lens 6 is slightly reduced as compared with the first embodiment. Even in such a case, the light beam separation in the sub-scanning direction on the multistage toric surface of the imaging lens 6 may be sufficiently achieved. In addition, the height of the optical scanning apparatus in the sub-scanning direction may be reduced as compared with the comparative example in which the plane mirror 7 is significantly tilted.

(Third Embodiment)

Figure 10:
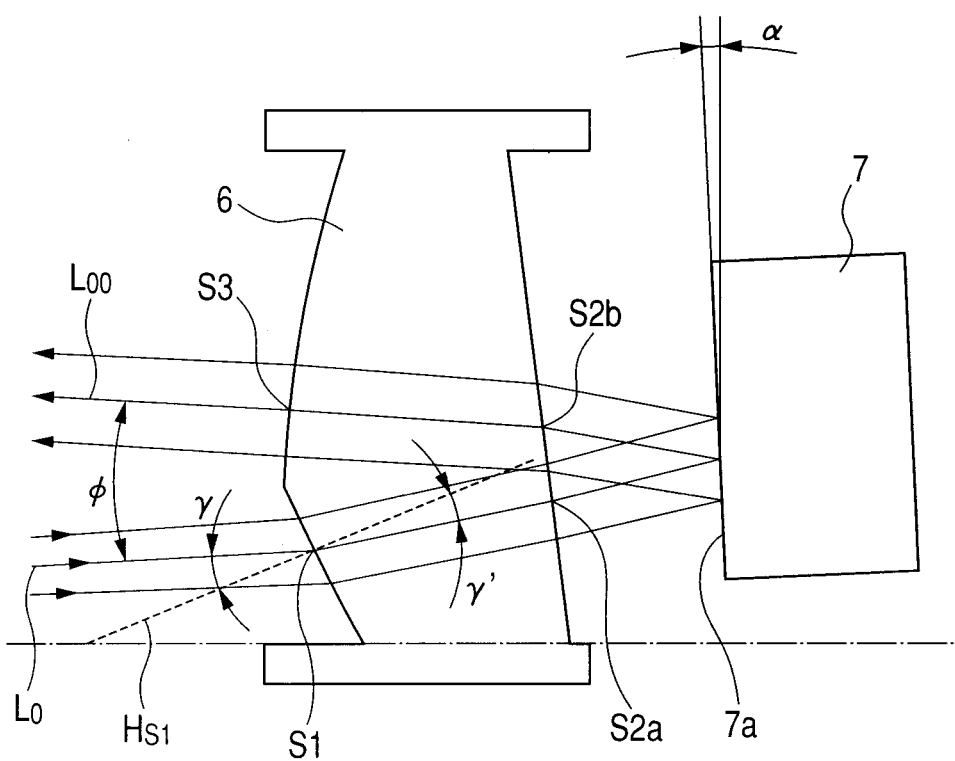
FIG. 10 is a sub-scanning cross sectional view illustrating an imaging optical system according to a third embodiment of the present invention.
Figure 11A:
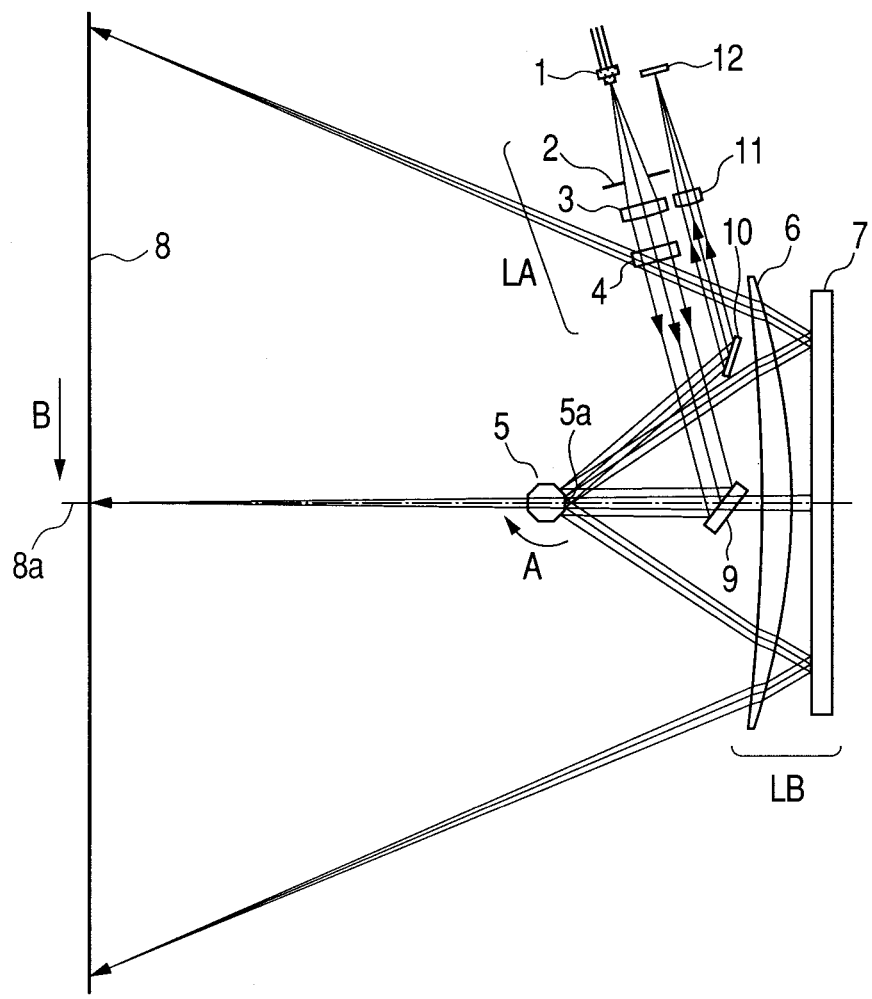
FIG. 11A is a main scanning cross sectional view illustrating an optical scanning apparatus according to the third embodiment of the present invention and FIG. 11B is a sub-scanning cross sectional view illustrating the optical scanning apparatus according to the third embodiment of the present invention.
Figure 11B:
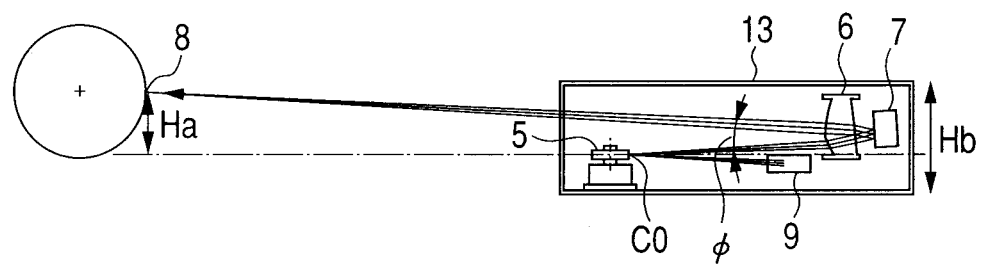

FIG. 10 is a cross sectional view illustrating a main portion of an imaging optical system in a sub-scanning direction (sub-scanning sectional view), the imaging optical system being used for an optical scanning apparatus according to a third embodiment of the present invention. FIG. 11A is a cross sectional view illustrating a main portion of the optical scanning apparatus according to the third embodiment of the present invention, in a main scanning direction (main scanning sectional view). FIG. 11B is a cross sectional view illustrating a main portion of the optical scanning apparatus according to the third embodiment of the present invention, in a sub scanning direction (sub scanning sectional view). In FIGS. 10, 11A, and 11B, the same components as illustrated in FIGS. 1, 2A, and 2B are denoted by the same reference symbols.

This embodiment is different from the first embodiment described above in that the effect of upward bending of the light beam (refractive action of light beam) at the surface S1 is further enhanced. The other structures and optical actions are similar to those of the first embodiment, and hence the same effect is obtained.

Even in this embodiment, as in the first embodiment, the light beam enters (frontally enters) the deflection surface 5a at the middle or substantially middle of the deflection angle of the optical deflector 5 in the main scanning section. In the sub-scanning section, the light beam enters (obliquely enters) the deflection surface 5a at a predetermined angle relative to the sub-scanning direction (3° relative to normal to deflection surface). Table 4 illustrates lens surface shapes and an optical configuration in this embodiment.

TABLE 4

| Design Data | | | |
|---|---|---|---|
| Used wavelength | λ(nm) | | 790 |
| Lens refractive index | n | | 1.52781 |
| Main scanning laser incident angle (degrees) | | | 0 |
| Sub-scanning laser incident angle (degrees) | | | 3 |
| Maximum light beam exit angle (degrees) | | | ±33.423 |
| Polygon rotation center coordinates (mm) | Y-direction | | 0.000 |
| | X-direction | | −4.157 |
| The number of Polygon surfaces | | | 8 |
| Polygon circumcircle diameter (mm) | | | φ9 |
| Mirror tilt angle (degrees) | α | | −2 |
| Effective scanning width | W | | 210 |
| fθ coefficient | κ(rad/mm) | | 180 |

| Lens Configuration | | | |
|---|---|---|---|
| | X-direction | Y-direction | Z-direction |
| Lens incidence surface S1 | 45.000 | 0.000 | 2.358 |
| Lens exit surface S2a | 51.500 | 0.000 | 0.000 |
| Mirror surface 7 | 55.500 | 0.000 | 0.000 |
| Lens reincidence surface S2b | 51.500 | 0.000 | 0.000 |
| Lens re-exit surface S3 | 44.300 | 0.000 | 5.700 |
| Surface to be scanned 8 | −109.283 | 0.000 | 13.945 |

TABLE 4-continued

| Design Data | | | |
|---|---|---|---|
| Meridional aspherical data (main scanning direction) | | | |
| | S1 | S2a/S2b | S3 |
| R | −2.06863E+02 | −1.18058E+02 | −2.06863E+02 |
| K | 5.65828E+00 | −3.54051E+00 | 5.65828E+00 |
| B4 | 8.94578E−07 | 6.03364E−07 | 8.94578E−07 |
| B6 | −1.06101E−10 | −1.04011E−10 | −1.06101E−10 |
| B8 | 6.59484E−15 | 1.04644E−14 | 6.59484E−15 |
| B10 | −4.95415E−18 | −6.18904E−18 | −4.95215E−18 |
| B12 | 0.00000E+00 | 0.00000+00 | 0.00000E+00 |
| Sagittal line aspherical data (sub-scanning direction) | | | |
| | S1 | S2a/S2b | S3 |
| r | 9.34762E+01 | 0.00000E+00 | 2.88542E+01 |
| D2 | 2.78878E−05 | 0.00000E+00 | −1.80050E−05 |
| D4 | −1.20675E−09 | 0.00000E+00 | 9.19748E−09 |
| D6 | −7.65204E−11 | 0.00000E+00 | −1.35330E−12 |
| D8 | 1.27655E−13 | 0.00000E+00 | −1.76379E−15 |
| D10 | −7.69894E−17 | 0.00000E+00 | 9.30381E−19 |
| D12 | 1.40767E−20 | 0.00000E+00 | −1.31361E−22 |
| M0_1 | −5.20000E−01 | −1.30191E−01 | 9.05601E−02 |
| M2_1 | −1.55719E−04 | 0.00000E+00 | 3.09997E−05 |
| M4_1 | 2.08156E−07 | 0.00000E+00 | −1.60758E−08 |
| M6_1 | −2.36976E−10 | 0.00000E+00 | 1.21822E−11 |
| M8_1 | 1.24429E−13 | 0.00000E+00 | −1.17861E−15 |
| M10_1 | −1.58027E−17 | 0.00000E+00 | −6.25421E−19 |
| M12_1 | 0.00000E+00 | 0.00000E+00 | −3.56555E−23 |
| M0_3 | 2.70272E−04 | 0.00000E+00 | 0.00000E+00 |
| M2_3 | −1.16252E−07 | 0.00000E+00 | 0.00000E+00 |
| M4_3 | 4.02740E−10 | 0.00000E+00 | 0.00000E+00 |
| M6_3 | −3.61487E−13 | 0.00000E+00 | 0.00000E+00 |

Note that the aspherical shape expressions used in this embodiment and the setting of origins of lens surfaces are the same as in the first embodiment.

In this embodiment, the meridional line shape of each of the four lens surfaces (lens incidence surface S1, lens exit surface S2a, lens reincidence surface S2b, and lens re-exit surface S3) of the imaging lens 6 is formed in the aspherical shape expressed by the function of up to the tenth order. The surfaces S2a and S2b serve as a single surface defined by the same shape expression.

Even in this embodiment, as shown in Table 4, the multistage toric surface is employed in which the lens incidence surface S1 and the lens re-exit surface S3 which are located on the optical deflector 5 side of the imaging lens 6 have the same shape in the main scanning direction and are different in shape from each other in the sub-scanning direction. Even in this embodiment, as in the first embodiment, the sub-scanning interval between the marginal ray of the incident light beam and the marginal ray of the exit light beam on the multistage toric surface side is set to approximately 1.5 mm. In this embodiment, the infrared light source having the light beam oscillation wavelength λ of 790 nm is used as the light source unit 1. The proportional coefficient κ (Y=κθ) with respect to the image height Y and the deflection reflection angle θ is equal to 180 (rad/mm).

Figure 12A:
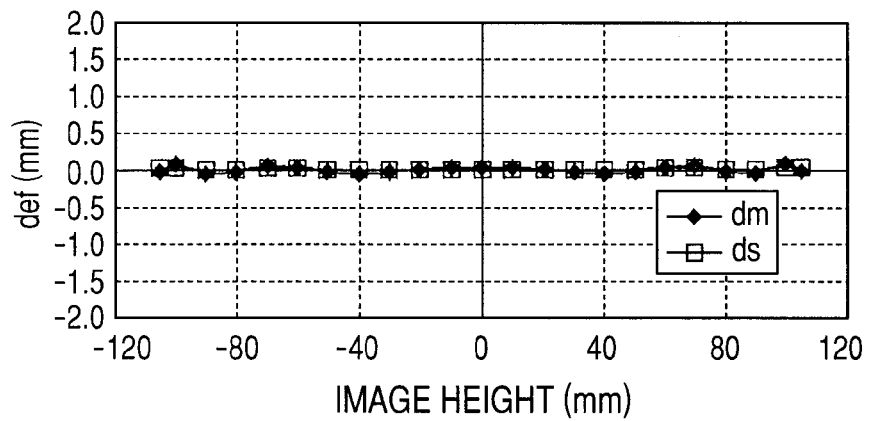
FIG. 12A is a graph illustrating curvatures of field according to the third embodiment of the present invention.

FIG. 12A is a graph illustrating curvatures of field in the main scanning direction and the sub-scanning direction, according to the third embodiment of the present invention. In FIG. 12A, dm indicates the curvature of field in the main scanning direction and ds indicates the curvature of field in the sub-scanning direction. In a case of an effective image width (W=210 mm), the curvature of field in the main scanning direction is 0.13 mm and the curvature of field in the sub-scanning direction is 0.03 mm. Therefore, it is apparent that both the curvatures of field are appropriately reduced.

Figure 12B:
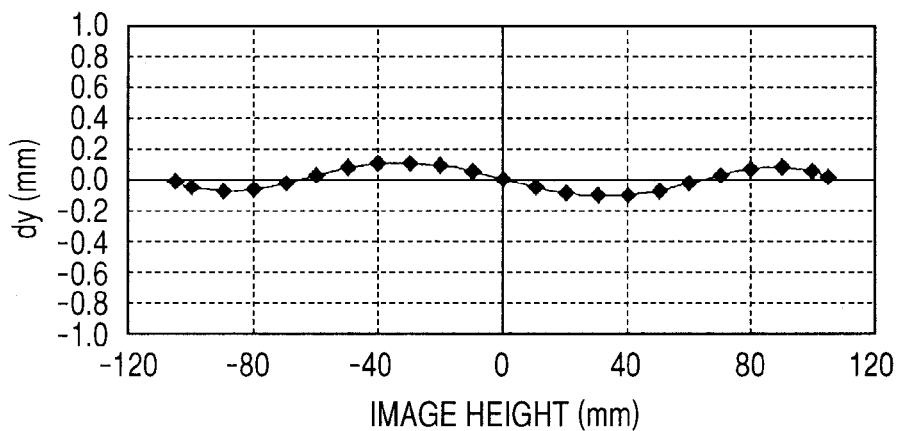
FIG. 12B is a graph illustrating an fθ characteristic.

FIG. 12B is a graph illustrating an fθ characteristic in the third embodiment of the present invention. FIG. 12B illustrates a difference between an actual position that a light beam actually reaches and an ideal image height. A maximum deviation is 0.106 mm. The value may be a little large in a sense of normal use. However, when an image clock is changed based on each image height, the fθ characteristic may be reduced. Note that, when the deviation of the fθ characteristic is too large, a spot diameter in the main scanning direction changes. This embodiment exhibits an fθ characteristic in which the spot diameter affecting a latent image depth is at a sufficiently problem-free level.

Figure 12C:
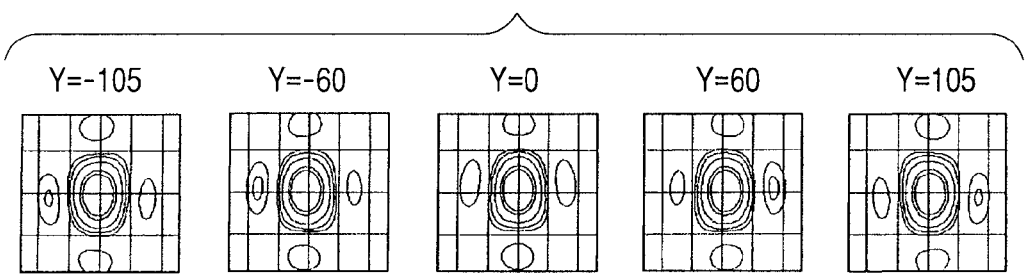
FIG. 12C is an explanatory diagram illustrating a spot profile.

FIG. 12C is an explanatory diagram illustrating spot sectional shapes at respective image heights. FIG. 12C illustrates cross sections obtained by slicing in 2%, 5%, 10%, 13.5%, 36.8%, and 50% of a spot peak light amount at the respective image heights.

In an optical scanning apparatus in which a light beam obliquely enters in the sub-scanning section, there generally occurs a phenomenon in which a spot rotates due to a twist of wavefront aberration. In this embodiment, the power configuration for each surface, the lens tilt amount, and the shift amount are optimized, to thereby reduce the twist of wavefront aberration. In particular, the surface tilt angle (sagittal line tilt amount) in the sub-scanning direction is changed into the main scanning direction on the two surfaces, that is, the lens incidence surface S1 and the lens re-exit surface S3, so that the spot rotation due to the twist of wavefront aberration and bending of the scanning line described below may be simultaneously and appropriately corrected.

The surface in which the sagittal line tilt amount is changed into the main scanning direction may be also introduced for the surfaces S2a and S2b. However, the light beam is not sufficiently separated on the surfaces S2a and S2b. Therefore, the surface in which the sagittal line tilt amount is changed into the main scanning direction is effectively introduced for the surfaces S1 and S3 on which the light beam is sufficiently separated.

Figure 13A:
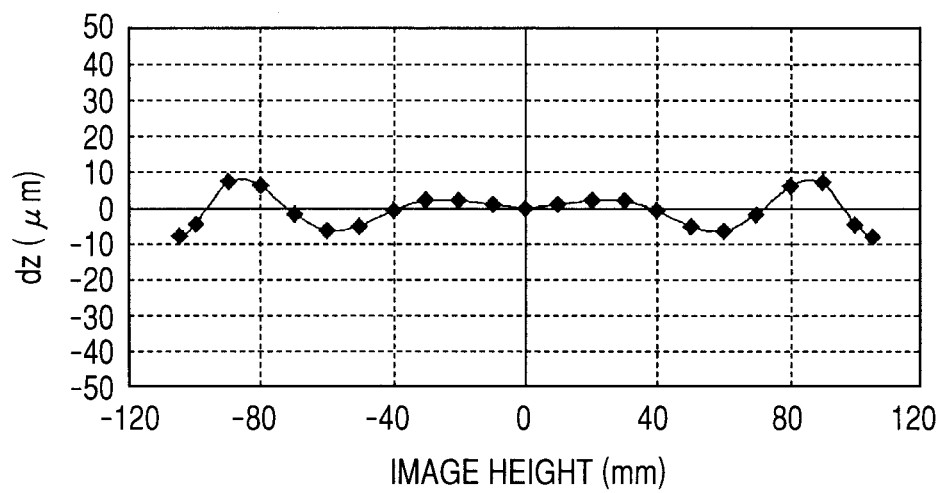
FIG. 13A is a graph illustrating bending of the scanning line according to the third embodiment of the present invention and FIG. 13B is a graph illustrating a change of the tilt angle in sub-scanning of a surface of an imaging lens for scanning.

FIG. 13A is a graph illustrating the bending of the scanning line reaching the surface to be scanned according to the third embodiment of the present invention. In a case of a monochrome image forming apparatus, the bending of the scanning line is normally required to be within 0.2 mm. In this embodiment, the bending of the scanning line is suppressed to 15.4 θm, which is at a problem-free level even for use in a color apparatus.

Next, an effect of scanning light beam refractive action (upward beam bending) on the lens incidence surface S1, which is an essential part of the present invention, is described with reference to FIGS. 10 and 11B.

In this embodiment, the angle $\gamma(°)$ defined in the sub-scanning section and between the direction of the principal ray $L_0$ of the light beam entering the surface S and the normal (chain line) $H_{S1}$ to the surface S1 is as follows.

$$\gamma = 24.47°$$

Assume that $\gamma'(°)$ indicates the angle defined in the sub-scanning section and between the direction of the principal ray $L_0$ of the light beam refracted at the surface S1 and the normal (chain line) $H_{S1}$ to the surface S1. The refractive index "n" of the imaging lens 6 is equal to 1.52781, and hence the angle $\gamma'$ is as follows.

$$\gamma' = 15.73°$$

Therefore, the light beam is bent upward at the surface S1 (refractive action of scanning light beam) by the following value.

$$\gamma - \gamma' = \gamma - A\sin(\sin \gamma/n) = 8.74°$$

Thus, the effect of upward bending of the light beam at the surface S1 of the imaging lens 6 is further enhanced, as compared with the first embodiment.

In this embodiment, in order to satisfy Conditional Expression (3), the absolute value of the angle ($\alpha(°)$) defined in the sub-scanning section and between the deflection surface 5a of the optical deflector 5 and the reflection surface 7a of the plane mirror 7 is set to 2° so that the plane mirror 7 is tilted downward. The surface S1 is largely tilted in the sub-scanning direction as compared with the first embodiment, so that the light beam passing through the surface S1 is greatly bent upward. With this configuration, the light beam separation on the multistage toric surface side may be appropriately achieved by tilting the plane mirror 7 downward, contrary to the second embodiment.

Figure 13B:
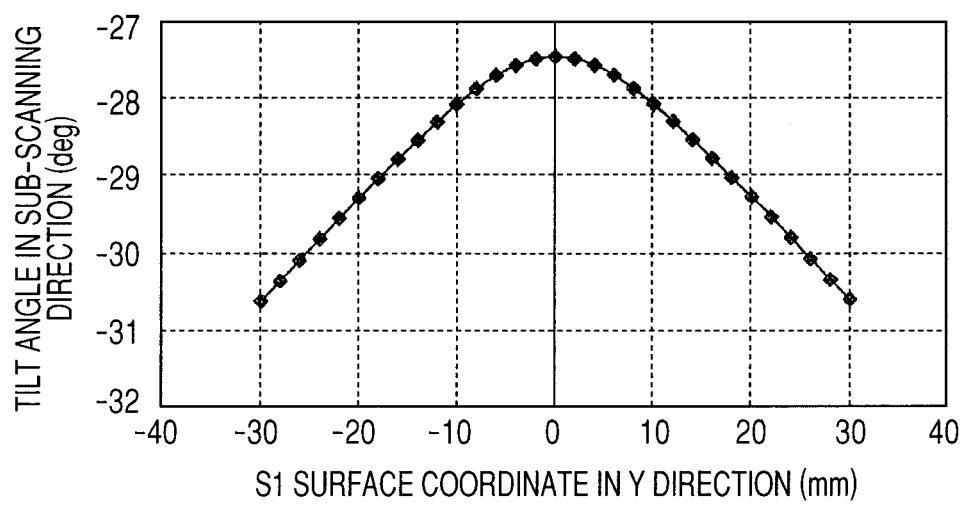

As illustrated in FIG. 13B, the surface S1 is changed so that the absolute value of the tilt angle in the sub-scanning direction increases from the on-axis to the off-axis. Therefore, the light beam separation resulting from the upward bending of the light beam and the correction of the twist of wavefront aberration and the bending of the scanning line as described above are simultaneously achieved.

The surface S1 is significantly tilted in the sub-scanning direction, and hence coma is caused in the sub-scanning section. Therefore, the three-order aspherical surface is used in the sagittal line direction to appropriately correct the coma in the sub-scanning direction as illustrated in FIG. 12C. The three-order aspherical surface may be provided for any of the lens surfaces to obtain an effect. The three-order aspherical surface may be most effectively adopted for the surface S1 which is significantly tilted relative to the incident light beam in the sub-scanning direction.

The angle $\phi(°)$ defined in the sub-scanning section and between the direction of the principal ray $L_0$ of the light beam which is deflected for scanning by the optical deflector 5 and scans the scanning center in the main scanning section, and the direction of the principal ray $L_{00}$ of the light beam which is turned back by the plane mirror 7 and exited from the surface S3 of the imaging lens 6 is as follows.

$$\phi = 5.99°$$

This satisfies Conditional Expression (2).

When Conditional Expression (2) is satisfied, the optical scanning apparatus may be made compact in the sub-scanning direction as illustrated in FIG. 11B, and the distance between the deflection reflection point C0 and the surface to be scanned 8 in the sub-scanning direction may be reduced.

In this embodiment, the distance Ha (mm) between the deflection reflection point C0 and the surface to be scanned 8 in the sub-scanning direction and the height Hb (mm) of the optical scanning apparatus (case 13) in the sub-scanning direction are as follows.

Ha=13.9 mm

Hb=24 mm

Therefore, the entire apparatus may be made more compact than in the above-mentioned comparative example.

As described above, in this embodiment, the effect of upward bending of the light beam at the surface S1 of the imaging lens 6 is further enhanced as compared with the first embodiment. Even in such a case, the light beam separation in the sub-scanning direction on the multistage toric surface of the imaging lens 6 may be sufficiently achieved. In addition, the height of the optical scanning apparatus in the sub-scanning direction may be reduced as compared with the comparative example in which the plane mirror 7 is significantly tilted.

While the light scanning apparatuses have been described with reference to exemplary embodiments as aspects of the present invention, it is to be understood that the invention is not limited to the disclosed exemplary embodiments.

(Image Forming Apparatus)

Figure 14:
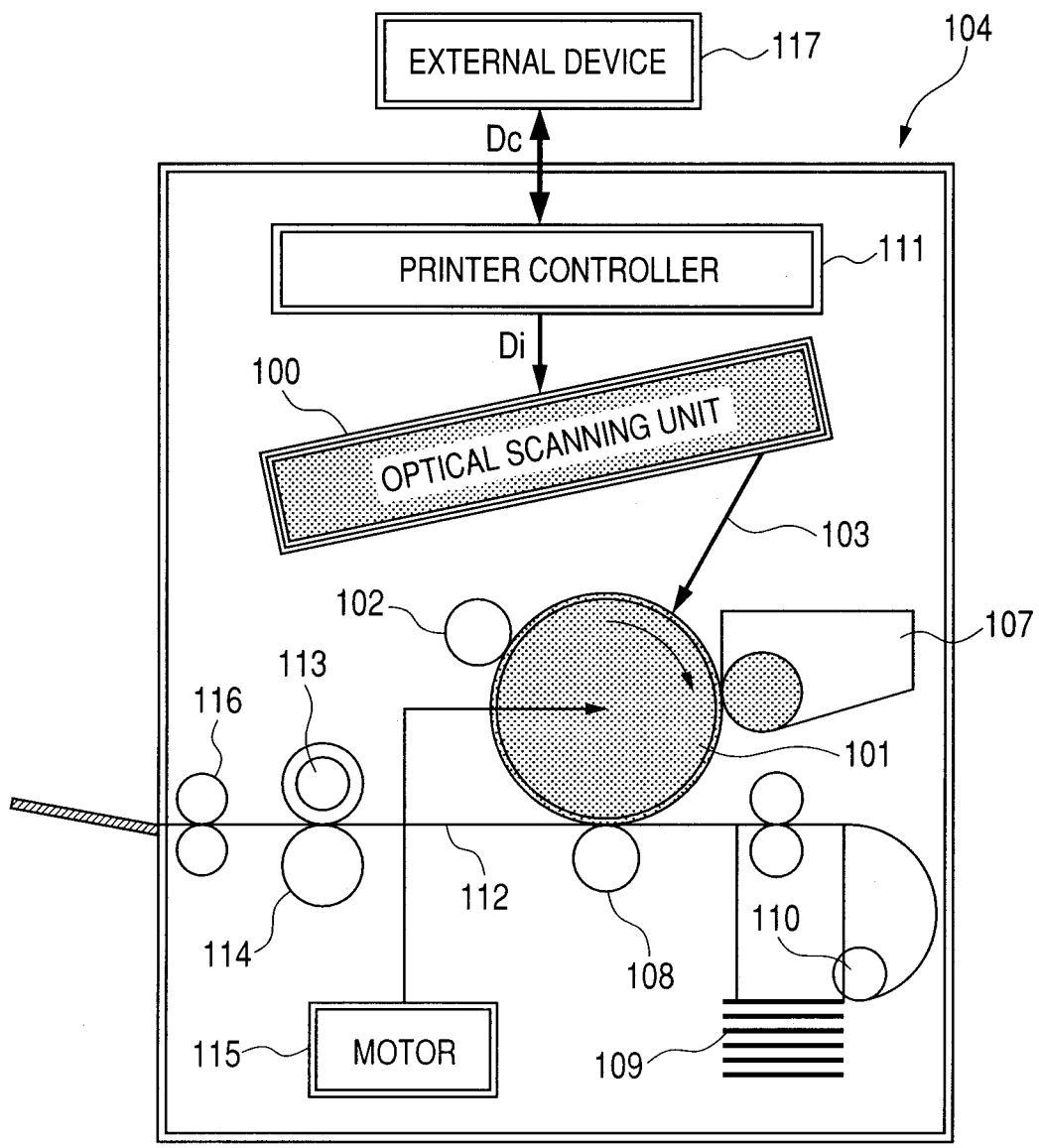
FIG. 14 is a sub-scanning cross sectional diagram illustrating an image forming apparatus according to an embodiment of the present invention.

FIG. 14 is a principal cross sectional view in the sub-scanning direction, illustrating an embodiment of an image forming apparatus according to the present invention. FIG. 14 illustrates an image forming apparatus 104. Code data Dc is input from an external device 117, for example, a personal computer, to the image forming apparatus 104. The code data Dc is converted into image data (dot data) Di by a printer controller 111 included in the image forming apparatus 104. The image data Di is input to an optical scanning unit 100 having the structure described in any one of the first to third embodiments. A light beam 103 modulated based on the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. With the rotation, the photosensitive surface of the photosensitive drum 101 is moved relative to the light beam 103 in the sub-scanning direction orthogonal to the main scanning direction. A charging roller 102 for uniformly charging the surface of the photosensitive drum 101 is provided on the photosensitive drum 101 as being in contact with the surface thereof. The surface of the photosensitive drum 101 which is charged by the charging roller 102 is irradiated with the light beam 103 scanned by the optical scanning unit 100.

As described above, the light beam 103 is modulated based on the image data Di, and hence an electrostatic latent image is formed on the surface of the photosensitive drum 101 which is irradiated with the light beam 103. The electrostatic latent image is developed into a toner image by a developing device 107 provided in contact with the photosensitive drum 101 on the more downstream side than the irradiation position of the light beam 103 in the rotation direction of the photosensitive drum 101.

The toner image obtained by the developing device 107 is transferred onto a sheet 112 serving as a transfer material by a transfer roller 108 which is provided under the photosensitive drum 101 and opposed to the photosensitive drum 101. The sheet 112 is stored in a sheet cassette 109 provided in front (in the right in FIG. 14) of the photosensitive drum 101. The sheet 112 may be manually fed. A feed roller 110 is provided at an end portion of the sheet cassette 109 to feed the sheet 112 stored in the sheet cassette 109 to a transport path.

Then, the sheet 112 on which the unfixed toner image is transferred is conveyed to a fixing device provided in the rear (in the left in FIG. 14) of the photosensitive drum 101. The fixing device includes a fixing roller 113 having a fixing heater (not shown) and a pressure roller 114 which is provided in press contact with the fixing roller 113. The sheet 112 conveyed from the transfer portion is heated under a pressurized state in a portion in which the fixing roller 113 and the pressure roller 114 are in press contact with each other, to thereby fix the unfixed toner image on the sheet 112. A discharge roller 116 is provided in the rear of the fixing roller 113 to discharge the sheet 112 including a fixed image to the outside of the image forming apparatus.

Although not illustrated in FIG. 14, the printer controller 111 not only performs the data conversion described above but also controls, for example, drive motors including the motor 115, which are provided in respective parts of the image forming apparatus and in an optical scanning unit described later.

A recording density of the image forming apparatus used in the present invention is not particularly limited. However, when the recording density becomes higher, high quality is increasingly required. Therefore, the structures in the first to third embodiments of the present invention are more effective for an image forming apparatus of 1,200 dpi or more.

(Color Image Forming Apparatus)

Figure 15:
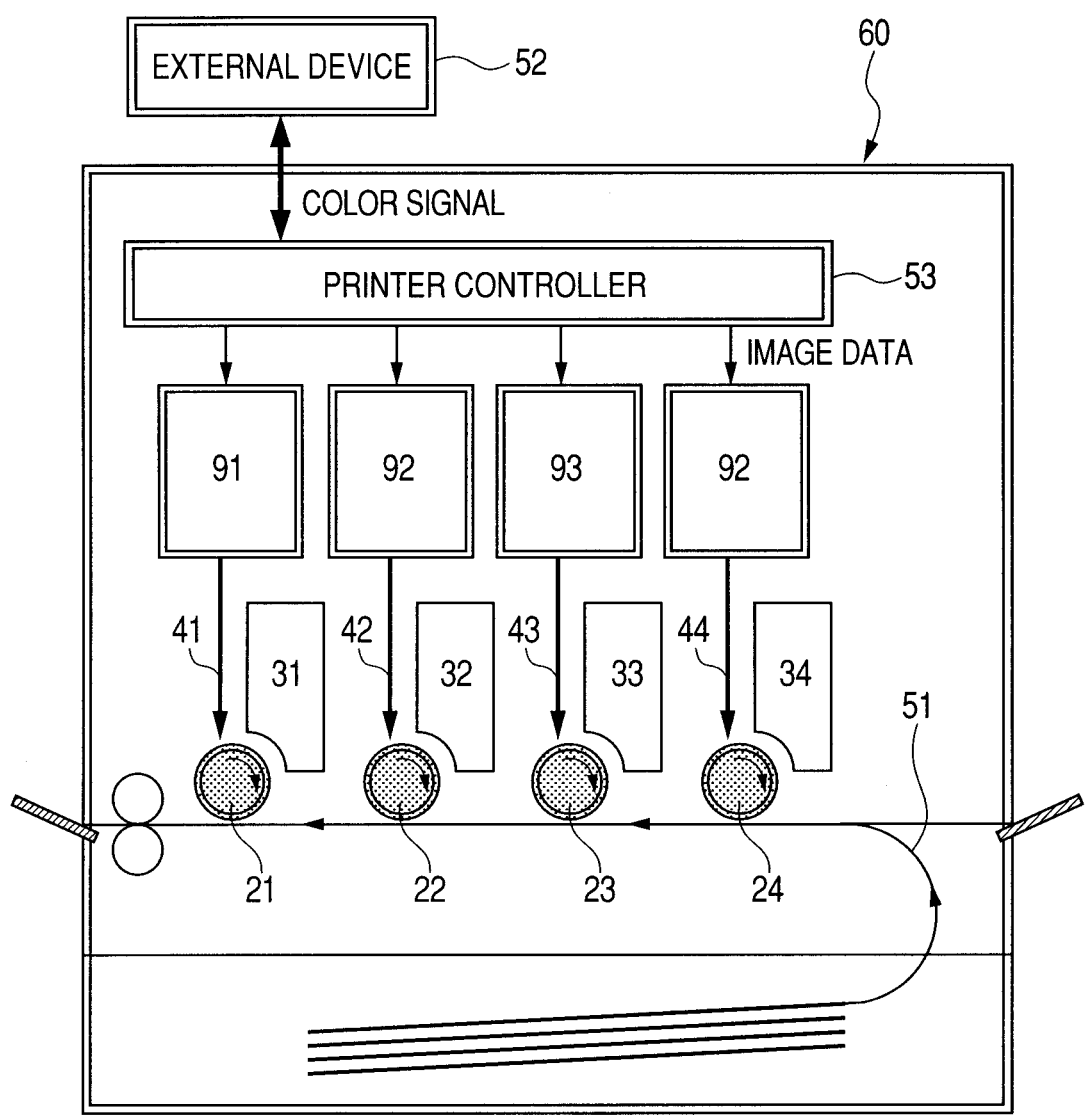
FIG. 15 is a principal schematic diagram illustrating a color image forming apparatus according to the present invention.

FIG. 15 is a schematic diagram illustrating a main portion of a color image forming apparatus according to an embodiment of the present invention. The color image forming apparatus of this embodiment is of tandem type, which includes four optical scanning apparatus (imaging optical systems) arranged side by side record concurrently image information on surfaces of photosensitive drums, which serve as image bearing members. FIG. 15 illustrates a color image forming apparatus 60, optical scanning apparatus 91, 92, 93, and 94 structured as illustrated in any one of the first to third embodiments, photosensitive drums 21, 22, 23, and 24 serving as image bearing members, developing devices 31, 32, 33, and 34, and a conveyor belt 51. It should be noted that, in FIG. 15, there are provided a transferring device (not shown) for transferring a toner image developed by the developing device onto a transfer material, and a fixing device (not shown) for fixing the transferred toner image on the transfer material.

In FIG. 15, respective color signals of red (R), green (G), and blue (B) are input from an external device 52 such as a personal computer to the color image forming apparatus 60. The color signals are converted into pieces of image data (dot data) of cyan (C), magenta (M), yellow (Y), and black (B) by a printer controller 53 in the color image forming apparatus. The respective pieces of image data are input to the optical scanning apparatus 91, 92, 93, and 94. Light beams 41, 42, 43, and 44, which are modulated according to the respective pieces of image data, are emitted from the optical scanning apparatus. The photosensitive surfaces of the photosensitive drums 21, 22, 23, and 24 are scanned with the light beams in a main scanning direction.

In the color image forming apparatus of this embodiment, the four optical scanning apparatus 91, 92, 93, and 94 are arranged side by side, corresponding to the respective colors of cyan (C), magenta (M), yellow (Y), and black (B). The optical scanning apparatus concurrently record the image signals (image information) on the surfaces of the photosensitive drums 21, 22, 23, and 24, and print a color image at high speed.

As described above, the color image forming apparatus of this embodiment uses the light beams which are respectively based on image data and emitted from the four optical scanning apparatus 91, 92, 93, and 94 to form latent images of four colors on the surfaces of the photosensitive drums 21, 22, 23, and 24 respectively associated with the four colors. The latent images are then transferred to a recording material one on another through multilayer transfer to form one full color image.

The external device 52 may be a color image reading device including, for example, a CCD sensor. In this case, the color image reading device and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-211549, filed Sep. 14, 2009, which is hereby incorporated by reference herein in its entirety.

What is claimed is:

1. An optical scanning apparatus, comprising:
   a light source unit;
   a deflection unit including a deflection surface;
   an incident optical system for guiding a light beam emitted from the light source unit to the deflection unit; and
   an imaging optical system for imaging, on a surface to be scanned, a light beam deflected for scanning on the deflection surface of the deflection unit, the imaging optical system including:
      a transmission type imaging optical element including a first transmission surface, a second transmission surface, a third transmission surface, and a fourth transmission surface; and
      a reflection optical element which includes a reflection surface and is provided on an optical path between the transmission type imaging optical element and the surface to be scanned, wherein:
   the light beam deflected for scanning on the deflection surface of the deflection unit passes through the transmission type imaging optical element in order of the first transmission surface and the second transmission surface, and after being reflected on the reflection surface of the reflection optical element, passes through the transmission type imaging optical element again in order of the third transmission surface and the fourth transmission surface;
   in a sub-scanning section, the light beam entering the first transmission surface is bent at the first transmission surface in a direction in which the light beam reflected on the reflection surface of the reflection optical element passes through the third transmission surface; and
   the following condition is satisfied:

$$0.5° < \gamma - \gamma' < 10°$$

where $\gamma(°)$ indicates an angle defined, in the sub-scanning section, between a principal ray of the light beam entering a scanning center of the first transmission surface in a main scanning section and a normal to the first transmission surface at an intersection of the principal ray and the first transmission surface, and $\gamma'(°)$ indicates an angle defined, in the sub-scanning section, between a principal ray of the light beam entering the scanning center of the first transmission surface in the main scanning section which is bent at the first transmission surface and the normal to the first transmission surface at an intersection of the principal ray and the first transmission surface.

2. An optical scanning apparatus according to claim 1, wherein the following condition is satisfied:

$$5° < \phi < 15°$$

where $\phi(°)$ indicates an angle defined, in the sub-scanning section, between the principal ray of the light beam which is deflected for scanning by the deflection unit and enters the scanning center of the first transmission surface in the main scanning section, and the principal ray of the light beam which is reflected on the reflection surface of the reflection optical element and exits from the fourth transmission surface.

3. An optical scanning apparatus according to claim 1, wherein the light beam exiting from the incident optical system obliquely enters the deflection surface of the deflection unit in the sub-scanning section.

4. An optical scanning apparatus according to claim 1, wherein the light beam exiting from the incident optical system has a light beam width in a main scanning direction which is wider than a width of the deflection surface of the deflection unit in the main scanning direction.

5. An optical scanning apparatus according to claim 1, wherein:
   the first transmission surface is a sagittal line aspherical surface in which a surface shape in the sub-scanning section has an aspherical shape; and
   an aspherical amount of the sagittal line aspherical surface reduces from an on-axis to an off-axis in a main scanning direction.

6. An optical scanning apparatus according to claim 1, wherein:
   the first transmission surface is a sagittal line tilt change surface in which a tilt angle in the sub-scanning section is changed based on a main scanning direction; and
   the tilt angle of the sagittal line tilt change surface in the sub-scanning section increases from an on-axis to an off-axis in the main scanning direction.

7. An optical scanning apparatus according to claim 1, wherein the following condition is satisfied:

$$\alpha < 3°$$

where $\alpha(°)$ indicates an absolute value of an angle defined, in the sub-scanning section, between the deflection surface of the deflection unit and the reflection surface of the reflection optical element when the scanning center is scanned in a main scanning direction.

8. An image forming apparatus, comprising:
   the optical scanning apparatus according to claim 1;
   a photosensitive member provided on the surface to be scanned;
   a developing device for developing, as a toner image, an electrostatic latent image formed on the photosensitive member by the light beam scanned by the optical scanning apparatus;
   a transferring device for transferring the developed toner image to a transfer material; and
   a fixing device for fixing the transferred toner image on the transfer material.

9. An image forming apparatus, comprising:
   the optical scanning apparatus according to claim 1; and
   a printer controller for converting code data to be input from an external device into an image signal and inputting the image signal to the optical scanning apparatus.

10. An optical scanning apparatus, comprising:
    a light source unit;
    a deflection unit including a deflection surface;
    an incident optical system for guiding a light beam emitted from the light source unit to the deflection surface of the deflection unit; and
    an imaging optical system for focusing, on a surface to be scanned, a light beam deflected for scanning on the deflection surface of the deflection unit, the imaging optical system including:
       a imaging optical element including a first transmission surface, a second transmission surface, a third transmission surface, and a fourth transmission surface; and
       a reflection optical element which includes a reflection surface and is provided on an optical path between the imaging optical element and the surface to be scanned, wherein:

the light beam deflected for scanning on the deflection surface of the deflection unit passes through the imaging optical element in order of the first transmission surface and the second transmission surface, and after being reflected on the reflection surface of the reflection optical element, passes through the imaging optical element again in order of the third transmission surface and the fourth transmission surface;

in a sub-scanning section, the light beam entering the first transmission surface is bent at the first transmission surface; and the following condition is satisfied:

$$0.5° < \gamma - \gamma' < 10°$$

where $\gamma(°)$ indicates an angle defined, in the sub-scanning section, between a principal ray of the light beam entering a scanning center of the first transmission surface in a main scanning section and a normal to the first transmission surface at an intersection of the principal ray and the first transmission surface, and $\gamma'(°)$ in indicates an angle defined, in the sub-scanning section, between a principal ray of the light beam entering the scanning center of the first transmission surface in the main scanning section which is bent at the first transmission surface and the normal to the first transmission surface at an intersection of the principal ray and the first transmission surface.

* * * * *